(12) United States Patent
Paré, Jr. et al.

(10) Patent No.: US 6,834,109 B1
(45) Date of Patent: Dec. 21, 2004

(54) METHOD AND APPARATUS FOR MITIGATION OF DISTURBERS IN COMMUNICATION SYSTEMS

(75) Inventors: Thomas E. Paré, Jr., Mountain View, CA (US); Michail Tsatsanis, Santa Clara, CA (US); Ioannis Kanellakopoulos, Cupertino, CA (US); Mark Alan Erickson, San Bruno, CA (US); Cecilia Gabriela Galarza, San Francisco, CA (US); James W. Waite, Los Gatos, CA (US); Daniel Joseph Hernandez, San Jose, CA (US); Sunil C. Shah, Los Altos, CA (US); Ming Gu, San Jose, CA (US); Norman Man Leung Yuen, Cupertino, CA (US); Heberly Rosario, Sunnyvale, CA (US); Di Lin, San Jose, CA (US); Fernando Lopez-de-Victoria, Redwood City, CA (US)

(73) Assignee: Tokyo Electron Limited, Tokyo (JP)

( * ) Notice: Subject to any disclaimer, the term of this patent is extended or adjusted under 35 U.S.C. 154(b) by 684 days.

(21) Appl. No.: 09/710,610

(22) Filed: Nov. 10, 2000

Related U.S. Application Data
(60) Provisional application No. 60/215,514, filed on Jun. 30, 2000, provisional application No. 60/215,633, filed on Jun. 30, 2000, provisional application No. 60/215,637, filed on Jun. 30, 2000, provisional application No. 60/186,701, filed on Mar. 3, 2000, provisional application No. 60/170,005, filed on Dec. 9, 1999, provisional application No. 60/165,399, filed on Nov. 11, 1999, provisional application No. 60/164,972, filed on Nov. 11, 1999, and provisional application No. 60/165,244, filed on Nov. 11, 1999.

(51) Int. Cl.$^7$ .............................................. H04M 1/76
(52) U.S. Cl. ..................... 379/416; 379/417; 375/254; 375/278; 375/284; 375/285; 375/296; 375/346
(58) Field of Search ............................. 379/1.01, 10.01, 379/220.01, 414, 416, 417; 375/144, 148, 254, 278, 284, 285, 296, 346, 348

(56) References Cited

U.S. PATENT DOCUMENTS 4,649,505 A * 3/1987 Zinser et al. .......... 379/406.08

(List continued on next page.)

OTHER PUBLICATIONS

Lennart Ljung, IEEE Transactions on Automatic Control, vol. AC–23, No. 5, Oct. 1978, "Convergence Analysis of Parametric Identification Methods", pp 770–783.

(List continued on next page.)

*Primary Examiner*—Bing Q. Bui
(74) *Attorney, Agent, or Firm*—Blakely Sokoloff Taylor & Zafman LLP

(57) ABSTRACT

The present invention includes a method and system for compensating for cross-talk interference in communication systems. The method includes estimation of the interfering signals. Further, the method includes performing a compensation operation on at least one interfering signal.

72 Claims, 22 Drawing Sheets

U.S. PATENT DOCUMENTS

| | | | | |
|---|---|---|---|---|
| 4,669,113 | A | | 5/1987 | Ash et al. |
| 4,669,505 | A | * | 6/1987 | Nelson et al. ............... 137/874 |
| 4,715,064 | A | * | 12/1987 | Claessen ...................... 379/392 |
| 4,760,596 | A | * | 7/1988 | Agrawal et al. ........ 379/406.08 |
| 4,987,569 | A | * | 1/1991 | Ling et al. ................... 370/292 |
| 5,063,351 | A | | 11/1991 | Goldthorp et al. |
| 5,157,690 | A | * | 10/1992 | Buttle .......................... 375/232 |
| 5,319,636 | A | * | 6/1994 | Long et al. .................. 370/291 |
| 5,343,461 | A | | 8/1994 | Barton et al. |
| 5,406,552 | A | * | 4/1995 | Long et al. .................. 370/291 |
| 5,548,222 | A | * | 8/1996 | Jensen et al. ............... 324/628 |
| 5,632,272 | A | * | 5/1997 | Diab et al. ................... 600/323 |
| 5,848,151 | A | | 12/1998 | Boudy et al. |
| 5,880,959 | A | | 3/1999 | Shah et al. |
| 5,887,032 | A | | 3/1999 | Cioffi |
| 5,926,538 | A | | 7/1999 | Deryugin et al. |
| 5,929,896 | A | * | 7/1999 | Goodman et al. ........ 348/14.12 |
| 5,995,566 | A | | 11/1999 | Rickard et al. |
| 6,055,297 | A | | 4/2000 | Terry |
| 6,160,790 | A | | 12/2000 | Bremer |
| 6,195,594 | B1 | | 2/2001 | Shah et al. |
| 6,230,062 | B1 | | 5/2001 | Shah |
| 6,249,762 | B1 | * | 6/2001 | Kirsteins et al. ............. 704/233 |
| 6,400,781 | B1 | * | 6/2002 | Vandendorpe et al. ....... 375/350 |
| 6,434,233 | B1 | * | 8/2002 | Bjarnason et al. ...... 379/406.01 |
| 6,636,603 | B1 | * | 10/2003 | Milbrandt .............. 379/399.01 |
| 6,647,067 | B1 | * | 11/2003 | Hjelm et al. ................. 375/260 |
| 6,735,244 | B1 | * | 5/2004 | Hasegawa et al. .......... 375/219 |

OTHER PUBLICATIONS

Sergio Verdu, Cambridge University Press, "Multiuser Detection", 1998, pp 1–26, 56–66, 154–175, 384–387.

Guanghan Xu et al., IEEE Transactions on Signal Processing, vol. 43, No. 12, Dec. 1995, "A Least Squares Approach to Blind Channel Identification", pp 2982–2993.

Alexandra Duel–Hallen et al., IEEE Transactions on Communications, vol. 37, No. 5, May 1989, "Delayed Decision –Feedback Sequence Estimation", pp. 428–436.

K. Giridhar et al., IEEE Transactions on Communications, vol. 45, No. 4, Apr. 1997, "Nonlinear Techniques for the Joint Estimation of Cochannel Signals", pp 473–484.

Lang Tong et al., IEEE Transactions on Signal Processing, vol. 47, No. 9, Sep. 1999, "Joint Order Detection and Blind Channel Estimation by Least Squares Smoothing", pp 2345–2355.

Eric Moulines et al., IEEE Transactions on Signal Processing, vol. 43, No. 2, Feb. 1995, "Subspace Methods for the Blind Identification of Multichannel FIR Filters", pp 516–525.

Alexander Duel–Hallen et al., IEEE Personal Communications, Apr. 1995, "Multiuser Detection for CDMA Systems", pp 46–58.

Upamanyu Madhow et al., IEEE Transactions on Communications, vol. 42, No. 12, Dec. 1994, "MMSE Interference Suppression for Direct–Sequence Spread–Spectrum CDMA" pp 3178–3188.

C. Richard Johnson, Jr. et al., Proceedings of the IEEE, vol. 86, No. 10, Oct. 1998, "Blind Equalization Using the Constant Modulus Criterion: A Review", pp 1927–1950.

P. Ciblat et al., "Asymptotic Analysis of Blind Cyclic Correlation Based Symbol Rate Estimation", Sep. 2000.

Dr. Dennis J. Rauschmayer, Macmillan Technology Series, "ADSL/VDSL Principles", 1999, pp 131–155.

Lennart Ljung, Prentice–Hall Information and System Sciences Series, "System Identification, Theory for the User", 1987, pp 141–163, 239–263.

Yaakov Bar–Shalom et al., Artech House, Inc., "Estimation and Tracking: Principles, Techniques, and Software", 1993, pp 450–465.

International Telecommunication Union, ITU–T Telecommunication Standardization Sector of ITU, G.810, Definitions and Terminology for Synchronization Networks, Aug. 1996, pp 1–20.

ADSL Forum Technical Report TR–024 for Network Management Working Group, "DMT Line Code Specific MIB", Jun. 1999, pp 1–7.

J. Coiffi, EEE379A, Digital Communication: Signal Processing Class notes, Stanford University, pp 167–174, 194–197.

Arthur Gelb et al., The Analytic Sciences Corporation, "Applied Optimal Estimation", 1974, pp 156–179.

Simon Haykin, Prentice Hall Information and System Sciences Series, "Adaptive Filter Theory", Third Edition, 1996, pp 772–815.

Ian R. Petersen et al., Control Engineering, "Robust Kalman Filtering for Signal and Systems with Large Uncertainties", 1999, pp 35–55.

Stephen Boyd et al., "Convex Optimization", Course Reader for EE364: Introduction to Convex Optimization with Engineering Applications, Stanford University, Winter Quarter 1996–1997, pp 1–146.

Amit Mathur, Dissertation from Electrical and Computer Engineering, University of California, Santa Barbara, "Algorithms for Cochannel Source Separation and Signal Estimation", Dec. 1996, pp 1–165.

Edward A. Lee et al., Kluwer Academic Publishers, "Digital Communication", Second Edition, 1994, pp 408–424, 468–486.

Thomas Starr et al., Prentice Hall, Communication Engineering and Emerging Technologies, "Understanding Digital Subscriber Line Technology", 1999, pp 297–354.

D. Godard, IEEE Transaction Communications, vol. COM–28, No. 11, Nov. 1980, "Self–Recovering Equalization and Carrier Tracking in Two–Dimensional Data Communication Systems", pp 1867–1875.

Lennart Ljung, PTR Prentice Hall Information and System Sciences Series, "System Identification, Theory for the User", Second Edition, 1999, pp 79–139, 197–279, 317–360.

Raúl A. Casas et al., Broadcasting & Cable, "Current Approaches to Blind Decision Feedback Equalization", Aug. 1999, pp 1–52.

John G. Proakis, McGraw Hill Series in Electrical and Computer Engineering, Digital Communications, Third Edition, 1995, pp 267–286.

Craig Michael Teuscher, Dissertation submitted as requirement for the degree of Dr. of Philosophy in Engineering—Electrical Engineering and Computer Sciences, Low Power Receiver Design for Portalbe RF Applications: Design and Implementation of an Adaptive Multiuser Detector for an Indoor, Wideband CDMA Application, Fall 1998, pp 37, 43–52.

Claes Tidestav et al., Signals and Systems, Uppsala University, "Realizable MIMO Decision Feedback Equalizers", International Conference on Acoustics, Speech, and Signal Processing (ICASSP99) Mar. 1999, Phoenix, AZ, V. 5, pp 2591–2594.

K. Sam Shanmugan et al., John Wiley & Sons, "Random Signals, Detection, Estimation and Data Analysis", 1988, pp 341–377.

Harry L. Van Trees, Massachusetts Institute of Technology, "Detection, Estimation, and Modulation Theory", 1968, pp 19–163, 239–418.

International Search Report, Date of mailing: Mar. 27, 2001, PCT/US00/30859.

PCT Search Report, PCT/US00/42097, Nov. 10, 2000, Date of Mailing: Jun. 26, 2001 (5 pgs.).

PCT Search Report, PCT/US00/30858, Nov. 10, 2000, Date of Mailing: Mar. 16, 2001 (7 pgs.).

PCT Search Report, PCT/US00/30887, Nov. 11, 1999, Date of Mailing: Aug. 9, 2001 (24 pgs.).

PCT Search Report, PCT/US00/30967, Nov. 10, 2000, Date of Mailing: Jan. 24, 2001 (7 pgs.).

PCT Search Report, PCT/US00/31026, Nov. 10, 2000, Date of Mailing: Jan. 22, 2001 (7 pgs.).

Honig, M.L. et al, "Suppression of Near– and Far–End Crosstalk by Linear Pre– and Post–Filtering", Selected Areas in Communications, IEEE Journal on vol. 10 Issue 3, Apr. 1992, pp. 614–629, entire document.

* cited by examiner

METHOD AND APPARATUS FOR MITIGATION OF DISTURBERS IN COMMUNICATION SYSTEMS

This application claims the benefit of the filing date of the following Provisional U.S. Patent Applications: "IMPROVEMENTS IN EQUALIZATION AND DETECTION FOR SPLITTERLESS MODEM OPERATIONS", application Ser. No. 60/165,244, filed Nov. 11, 1999; "CROSS-TALK REDUCTION IN MULTI-LINE DIGITAL COMMUNICATION SYSTEMS", application Ser. No. 60/164,972, filed Nov. 11, 1999; "CROSS-TALK REDUCTION IN MULTI-LINE DIGITAL COMMUNICATION SYSTEMS", application Ser. No. 60/170,005, filed Dec. 9, 1999; "USE OF UNCERTAINTY IN PHYSICAL LAYER SIGNAL PROCESSING IN COMMUNICATIONS", application Ser. No. 60/165,399, filed Nov. 11, 1999;
"CROSS-TALK REDUCTION AND COMPENSATION", application Ser. No. 60/186,701, filed Mar. 3, 2000; "BLIND METHOD OF ONLINE COMPENSATION FOR INTERNAL CABLE
BINDER IMPAIRMENTS", application Ser. No. 60/215,514, filed Jun. 30, 2000;
"FREQUENCY DOMAIN CROSS-TALK COMPENSATION METHOD", application Ser. No. 60/215,633, filed Jun. 30, 2000; and
"TIME DOMAIN CROSS-TALK COMPENSATION METHOD", application Ser. No. 60/215,637, filed on Jun. 30, 2000.

BACKGROUND OF THE INVENTION

1. Field of the Invention

The present invention pertains to the field of communication systems. More specifically, the present invention relates to a method and apparatus for mitigating disturbers in communication systems.

2. Background Information

The speed at which data is transmitted or received in digital communication systems is significantly impaired by the level of background noise, impulse noise, cross-talk interference, ingress noise coming from appliances, AM radio, and other communication devices.

For example, in Digital Subscriber Line (DSL) configurations, cross-talk interference arises from electromagnetic coupling of physically proximate channels. In DSL systems, a data signal running along a telephone wire may be diminished by the noise that is injected by the other signals running on adjacent wires. The cross-coupling between two channels can create a highly correlated noise source that can degrade the performance of the transceiver and, in severe instances, completely disable the main communication channel. Cross-talk interference degrades the signal-to-noise ratio (SNR) of a data signal. Cross-talk interference may also shorten the distance the signal can be received reliably, i.e., it may limit loop reach. Additionally, cross-talk interference limits the bit rate for a given maximum allowable transmit power. Such limitations may lower the number of users for a particular system and may limit the deployment of communication systems in certain regions.

When analyzing a single line in a network system, the cross-talk from adjacent lines is considered a disturber or noise. If a modem operating on an impaired line has access to the disturber, it may be able to cancel the interference through adaptive filtering techniques. Such measurements, however, are not always possible due to the lack of physical proximity of modems within a network.

Other factors that influence the data transmission through a network are: the large number of network users, the large amount of data collected from the deployed lines, and the presernce of competing providers in the same physical line plant. The coexistence of ILECs (Incumbent Local Exchange Carriers) and CLECs (Competitive Local Exchange Carriers) in the same cable binders, brought about by the federally mandated deregulation of local telecommunication markets, implies that services deployed by one carrier may be disturbing the users of another carrier, who has no information about the source of this disturbance.

Thus, it is highly desirable to sort through the collected data and determine whether a specific line is being disturbed by external interference and whether that offending service belongs to the same carrier or not. Specifically, it is necessary to diagnose where the cross-talk problems are originating, predict how cross-talk affects services, and optimize the use of the system based on these predictions.

SUMMARY OF THE INVENTION

The present invention includes a method and system for compensating for cross-talk interference in communication systems. The method includes determining an estimation of at least one interfering signal and performing a compensation operation on the at least one interfering signal.

BRIEF DESCRIPTION OF THE DRAWINGS

The present invention is illustrated by way of example and not limitation in the accompanying figures in which.

DETAILED DESCRIPTION

Figure 1:
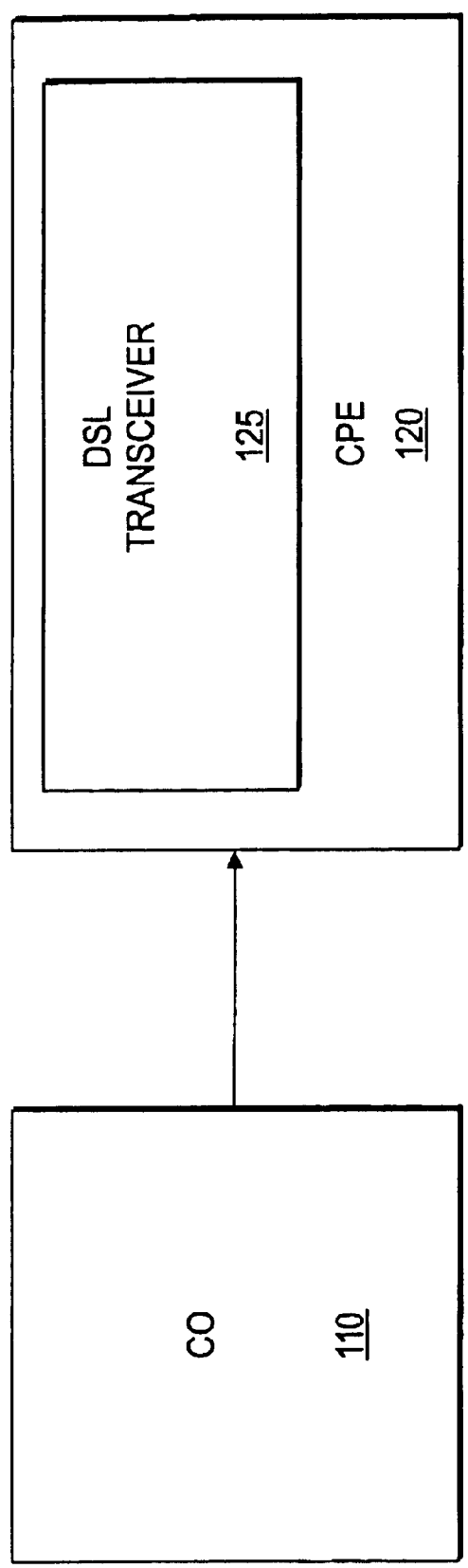
FIG. 1 illustrates a simplified diagram of an exemplary communication network.

A method and system for mitigation of disturbers in communication systems is disclosed. In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose digital signal processor computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, FPGAs or other hardware platforms, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

Overview of General Communication Network

Figure 23:
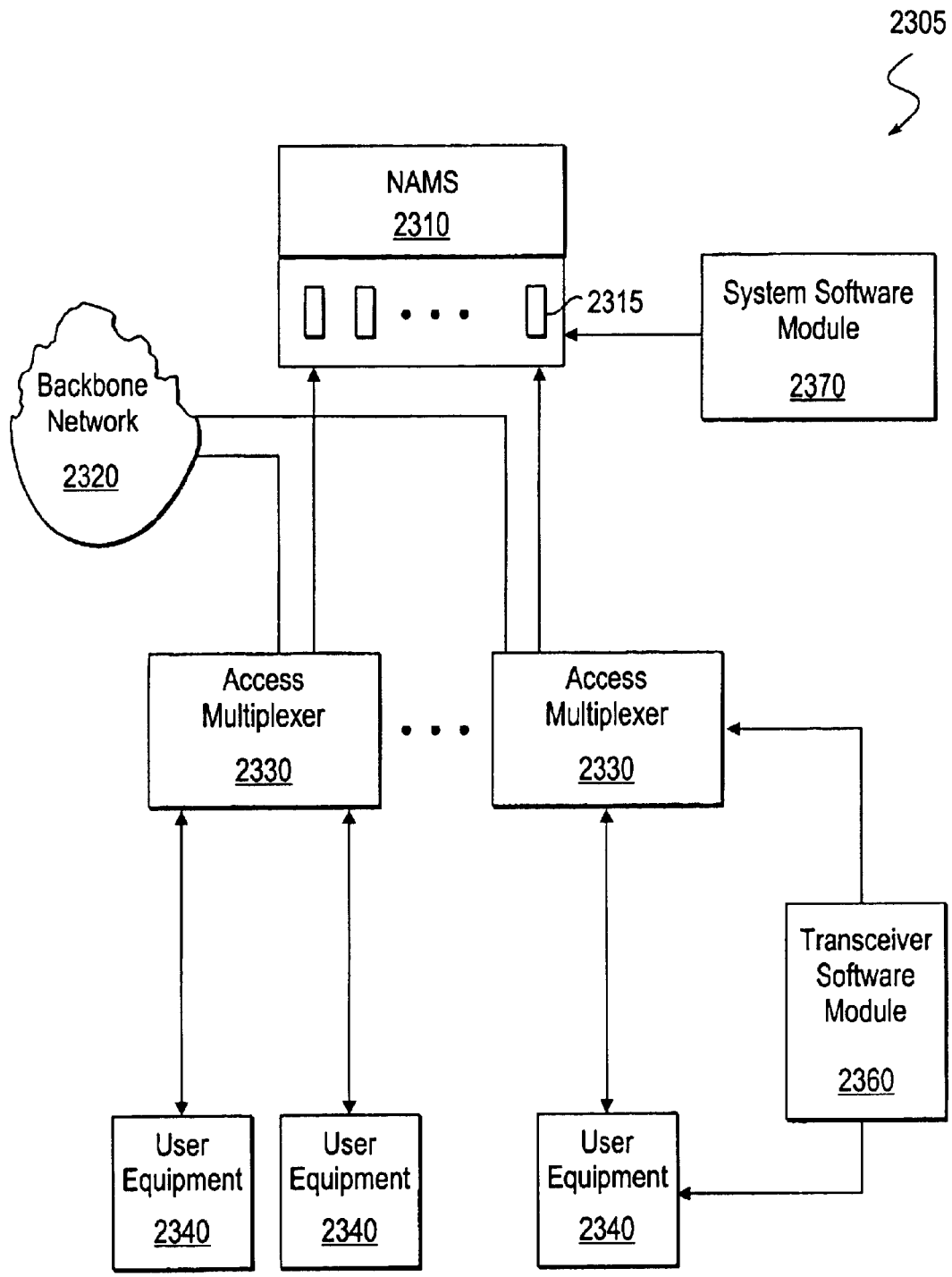
FIG. 23 illustrates an exemplary communication system.

The present invention is applicable to a variety of communication systems, for example: wireline, wireless, cable, and optical. FIG. 23 illustrates an exemplary communication system 2305 that may benefit from the present invention.

The backbone network 2320 is generally accessed by a user through a multitude of access multiplexers 2330 such as: base stations, DSLAMs (DSL Access Mulitplexers), or switchboards. The access multiplexers 2330 communicate management data with a Network Access Management System (NAMS) 2310. The NAMS 2310 includes several management agents 2315 which are responsible for monitoring traffic patterns, transmission lines status, etc. Further, the access multiplexers 2330 communicate with the network users. The user equipment 2340 exchanges user information, such as user data and management data, with the access multiplexer 2330 in a downstream and upstream fashion. The upstream data transmission is initiated at the user equipment 2340 such that the user data is transmitted from the user equipment 40 to the access multiplexer 2330. Conversely, the downstream data is transmitted from the access multiplexer 2330 to the user equipment 2340. User equipment 2340 may consist of various types of receivers that contain modems such as: cable modems, DSL modems, and wireless modems.

The invention described herein provides a method and system for managing the upstream and downstream data in a communication system. As such, the present invention provides management agents that may be implemented in the NAMS 2310, the access multiplexers 2330, and/or the user equipment 2340. One example of such a management agent is a system software module 2370 that may be embedded in the NAMS 2310. Another management agent that manages the data in the communication system 2305 is a transceiver software module 2360 that may be embedded in the access multiplexer 2330 and/or the user equipment 2340. Further details of the operation of modules 2370 and 2360 are described below.

For illustration purposes and in order not to obscure the present invention, an example of a communication system that may implement the present invention is a DSL communication system. As such, the following discussion, including FIG. 23 and FIG. 24, is useful to provide a general overview of the present invention and how the invention interacts with the architecture of the DSL system.

Overview of DSL Example

The present invention may be implemented in software modules or hardware that DSL equipment manufacturers may then embed in their hardware. Thus, although FIG. 24 illustrates the present invention as software, the present invention should not be limited thereto. It should also be noted that this patent application may only describe a portion or portions of the entire inventive system and that other portions are described in co-pending patent applications filed on even date herewith.

Figure 24:
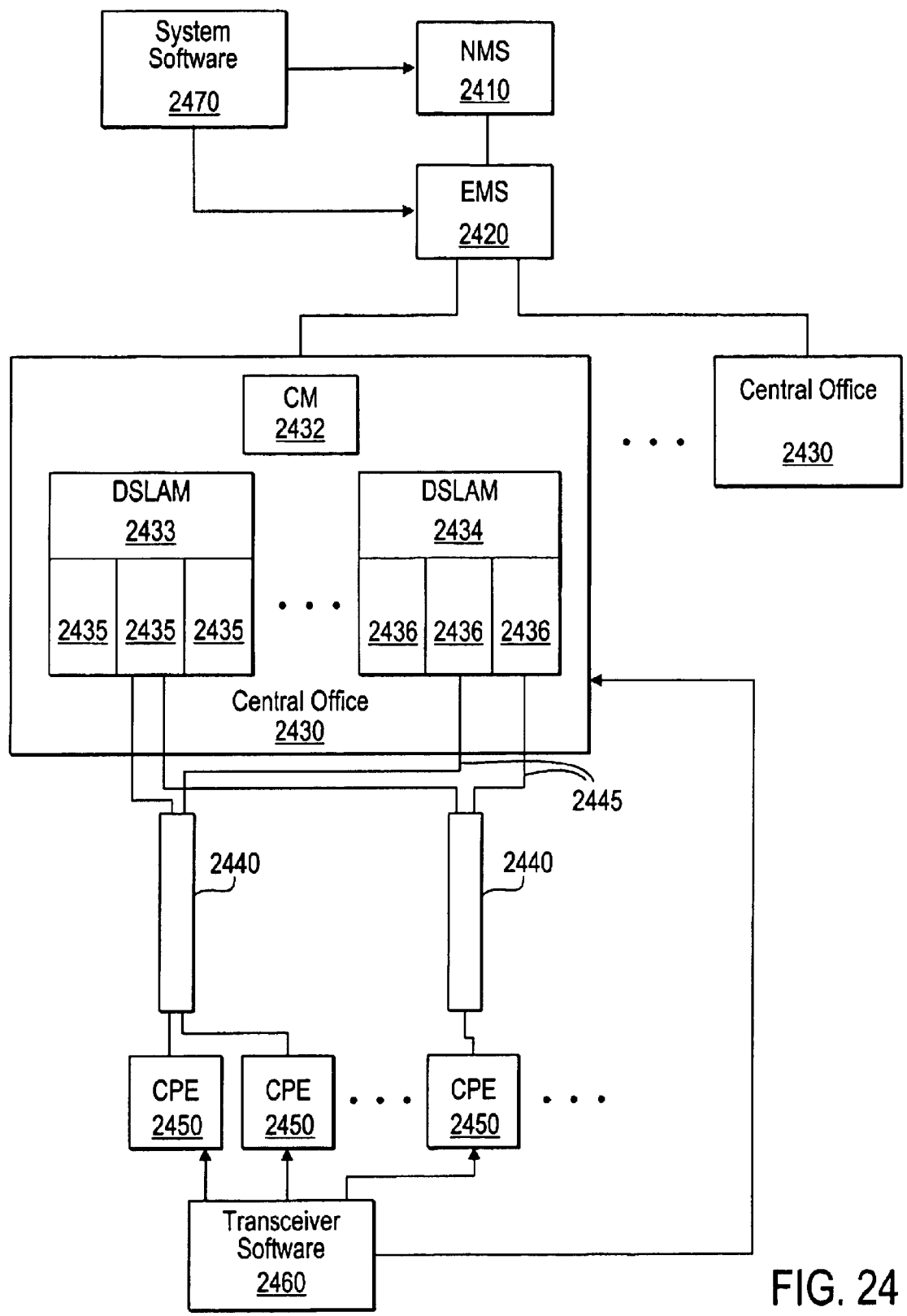
FIG. 24 illustrates an exemplary embodiment of the present invention as implemented in a DSL system.

FIG. 24 illustrates an exemplary embodiment of the present invention as implemented in a DSL system. The DSL system consists of a network of components starting from the Network Management System (NMS) 2410 all the way down to the Customer Premise Equipment (CPE) 2450. The following is a brief description of how these components are interconnected.

The Network Management System (NMS) 2410 is a very high level component that monitors and controls various aspects of the DSL system through an Element Management System (EMS) 2420. The NMS 2410 may be connected to several Central Offices (CO) 2430 through any number of EMSs 2420. The EMS 2420 effectively distributes the control information from the NMS 2410 to the DSL Access Multiplexers (DSLAMs) 2433 and forwards to the NMS 2410 network performance or network status indicia from the DSLAMs 2433. DSLAMs 2433 reside in a Central Office (CO) 2430, usually of a telecommunications company. Alternatively, DSLAMs 2433 may reside in remote enclosures called Digital Loop Carriers (DLC). The CO 2430 may have tens or hundreds of DSLAMs 2433 and control modules (CM) 2432. A DSLAM 3033 operates as a distributor of DSL service and includes line cards 2435 and 2436 that contain CO modems. The CO modems are connected to at least one line 2445, but more frequently it contains several line cards 2435 and 2436 that are connected to several lines 2445. Usually the lines 2445 are traditional phone lines that consist of twisted wire pairs and there may be multiple lines 2445 in a binder 2440 and multiple binders in a cable. The transmission cables act as packaging and protection for the lines 2445 until the lines 2445 reach the Customer Premise Equipment (CPE) 2450. It should be noted that a DSLAM 2435 does not necessarily have to be connected to lines 2445 in a single binder 2440 and may be connected to lines in multiple binders 2440. The lines 2445 terminate at the CPE 2450 in transceivers that include CPE modems. The CPE 2450 may be part of or connected to residential equipment, for example a personal computer, and/or business equipment, for example a computer system network.

As discussed in the background section, communications systems often suffer from interference and/or impairments such as crosstalk, AM radio, power ingress noise, thermal variations, and/or other "noise" disturbers. The present invention or portions of the present invention provide the user the capability to analyze, diagnose and/or compensate for these interferences and/or impairments. It also provides the ability to predict and optimize performance of the communication system in the face of impairments.

As illustrated in FIG. 24, the transceiver software of the present invention 2460, depending upon how implemented, may provide the user with the ability to analyze, diagnose, and compensate for the interference and/or impairment patterns that may affect their line.

Also as illustrated in FIG. 24, the system software 2470, depending upon how implemented, may provide the service provider with the ability to diagnose, analyze, and compensate for the interference and/or impairment patterns that may affect the service they are providing on a particular line. The diagnosis and analysis of the transceiver software also provide the ability to monitor other transmission lines that are not connected to the DSLAMs or NMS but share the same binders.

It should be noted that the system software 2470 may be implemented in whole or in part on the NMS 2410 and/or EMS 2420 depending upon the preference of the particular service provider. Likewise, it should be noted that the transceiver software of the present invention 2460 may be implemented in whole or in part on the DSLAM 2433 and/or transceivers of CPE 2450 depending upon the preference of the particular user. Thus, the particular implementation of the present invention may vary, and depending upon how implemented, may provide a variety of different benefits to the user and/or service provider.

It should also be noted that the system software 2470 and the transceiver software of the present invention 2460 may operate separately or may operate in conjunction with one another for improved benefits. As such, the transceiver software of the present invention 2460 may provide diagnostic assistance to the system software 2470. Additionally, the system software 2470 may provide compensation assistance to the transceiver software of the present invention 2460.

Thus, given the implementation of the present invention with respect to the DSL system example of FIG. 24, one of ordinary skill in the communications art would understand how the present invention may also be implemented in other communications systems, for example: wireline, wireless, cable, optical, and other communication systems. Further details of the present invention are provided below. Additional examples of how the present invention may be implemented in a DSL system are also provided below for illustrative purposes.

The present invention includes a method and apparatus for improving the quality of a digital signal on a main transmission line of a communication system by identifying the external disturbance signal and applying an opposite signal to compensate for the effect of the interference.

It will be appreciated that the compensation method disclosed herein may be used in various digital communication systems, such as: DSL, wireless, wireline, optical, or cable systems. However, the applicability of the present invention is not limited to such systems. FIG. 1 illustrates a typical DSL network that may benefit from the cross-talk compensation method disclosed herein. The DSL network illustrated in FIG. 1 consists of a Central Office (CO) 110 that is responsible for the management of the DSL system and provides services to the Customer Premises (CPE) 120. The CPE 120 consists of modems which contain DSL transceivers 120 responsible for 2-way transmission between the CPE lines and CO 110. It should be noted that the compensation method disclosed herein may be used at the transceiver level in any chip set that is directly connected to the signal line. Thus, DSL transceivers 120 that receive a disturbed signal may compensate for the cross-talk interference by using the present invention.

For illustration purposes, the following description depicts an example of a main transmission channel that is impaired by one or more disturbers, chosen to be controlled by an Asymmetric DSL (ADSL) modem. An ADSL channel may be characterized as a Discrete Multi Tone (DMT) channel. Using the cross-talk compensation method disclosed herein, disturbers that may be attenuated include, but they are not limited to: T1, E1, ISDN, or other DSL lines. These disturbers may be characterized as Pulse Amplitude Modulated (PAM) signals. It will be appreciated that the present invention also applies to disturbers that employ other modulation schemes such as QAM (Quadrature Amplitude Modulation), CAP, etc.

Overview of the Compensation Method

Figure 2:
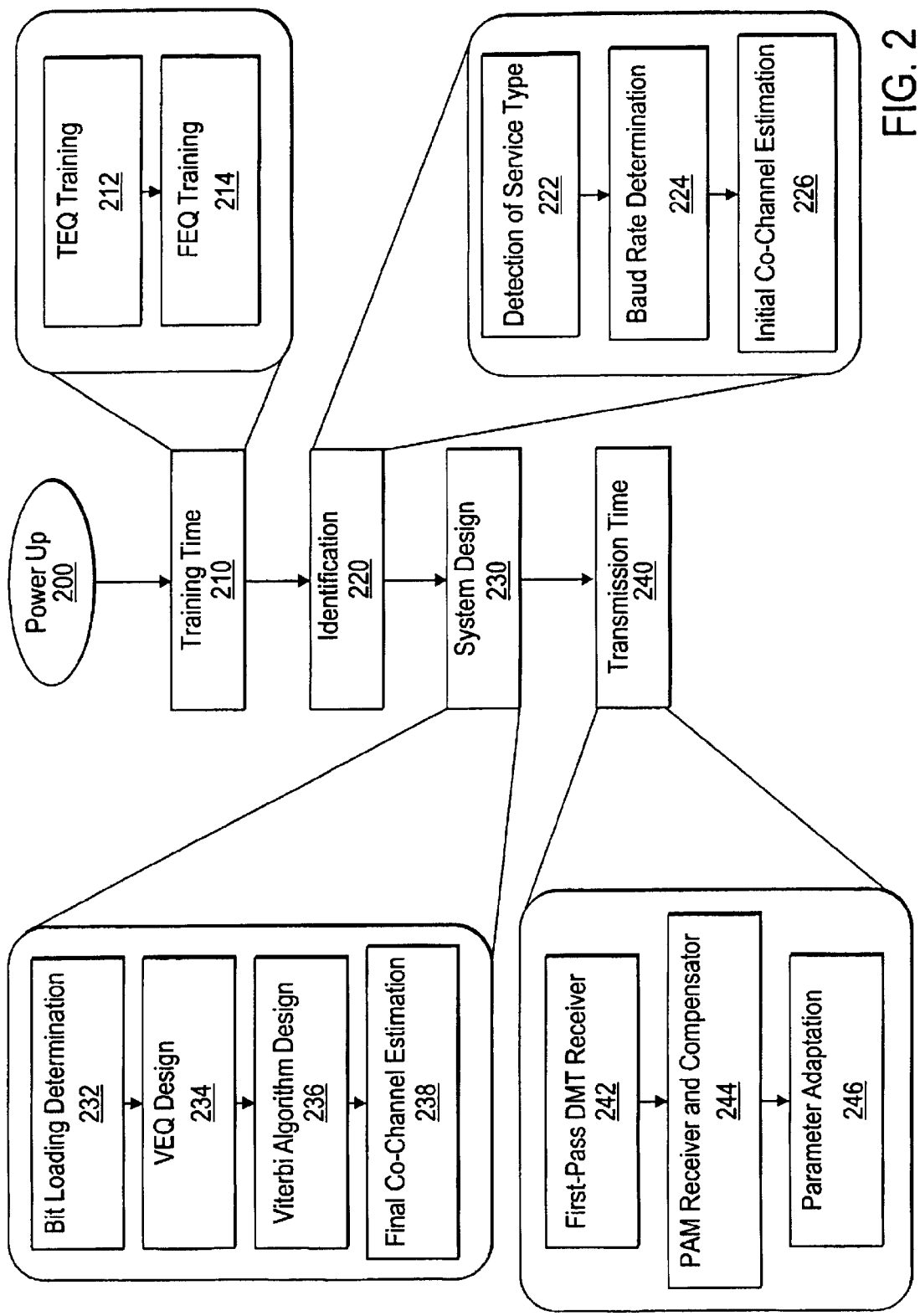
FIG. 2 illustrates a flow diagram of an interference compensation method according to one embodiment of the present invention.

FIG. 2 illustrates a flow diagram of the compensation method according to one embodiment of the present invention. The compensation method consists of the following main steps: training time 210, identification 220, system design 230, and data transmission time 240. The initial channel training time 210 is performed after the modem is powered up at step 200, as part of normal transceiver operation. During training time 210, Time Domain Equalizer (TEQ) training 212 and Frequency Domain Equalizer (FEQ) training 214 are performed, i.e., adaptation of the TEQ and FEQ parameters. Training time 210 further encompasses the estimation of the DMT signal and of the SNR of each frequency slot (bin) of the DMT signal. Following the training time 210, the identification phase 220 encompasses the detection of existing disturbers and the estimation of their associated transmission parameters. For example, during the identification phase 220, the active disturbers are detected at step 222 and their baud-rate determination 224 is performed. Additionally, an initial estimation of the co-channel impulse responses 226 is performed. More detailed descriptions of the training phase 210 and identification phase 220 are described in co-pending Patent Application Ser. No. 09/710,718, filed on even date herewith, entitled "Method and Apparatus for Characterization of Disturbers in Communication Systems", assigned to the assignee herein.

The system design phase 230 of the compensation method entails the actual iterative design of several components of a compensator module. The compensator module of the present invention may be located in a transceiver or in access multiplexers as illustrated in FIG. 23 and FIG. 24. Given the channel information from the Identification phase 220, a bit loading determination is performed at step 232. The bit loading is determined in order to achieve an acceptable first-pass DMT error rate and produce the desired bit rate or margin improvement. At step 234, a Viterbi Equalizer (VEQ) filter is designed in order to shorten the co-channel length and improve the SNR of the disturber signal. Next, at step 236, a Viterbi computational method is performed to detect the PAM disturber symbols. The PAM symbols detection is necessary for a more accurate data-aided final estimation 238 of other co-channels.

Lastly, the data transmission time phase 240 encompasses compensation of the PAM disturbance and final detection of the DMT signal in the PAM compensated environment. At step 242, a first-pass DMT receiver operation is performed. At step 244, during the PAM receiver and compensator phase, the adaptive VEQ processing and compensation of the detected PAM signal are performed. At step 246, the parameter adaptation is performed. A more detailed description of the transmission time phase 240 is described later below.

Figure 3:
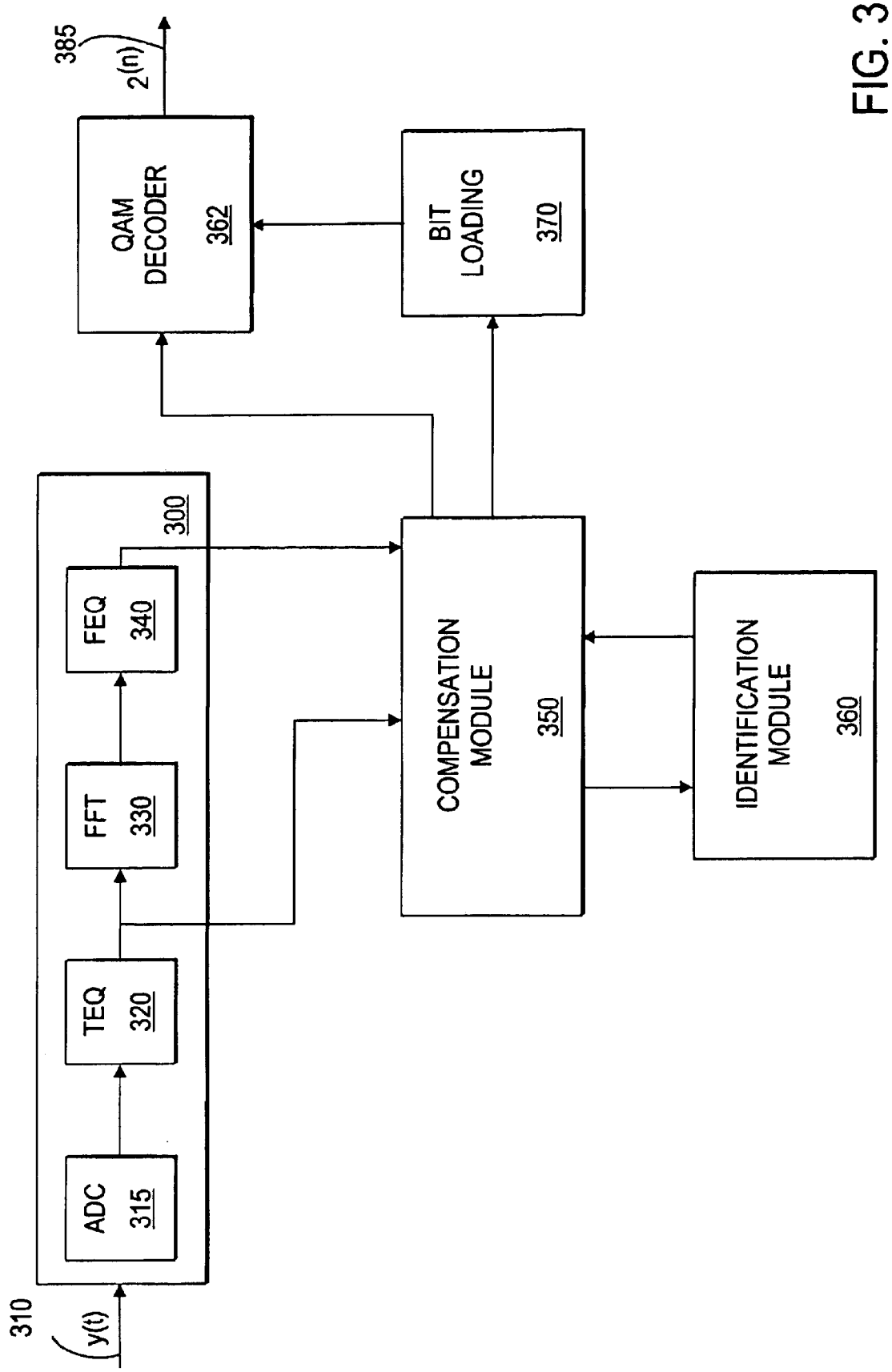
FIG. 3 illustrates a block diagram of one embodiment of a system implementing the compensation method illustrated in FIG. 2.

FIG. 3 illustrates a block diagram of a system implementing the compensation method illustrated in FIG. 2. The received signal y(t) 310 is first processed in a standard receiver 300. The signal y(t) 310 is first passed through an AD converter 315 and then it is filtered through a time domain equalizer (TEQ) 320. The output of the filter 320 is later utilized by the compensation module 350. The received signal is further processed with a prefix strip and Fast Fourier Transforms (FFT) 330. The signal is then filtered through a frequency domain equalizer (FEQ) 340. It will be appreciated that the operation of a standard communication receiver is well known by a person of ordinary skill in the art and, thus, further details of a receiver operation will not be described herein.

Figure 10:
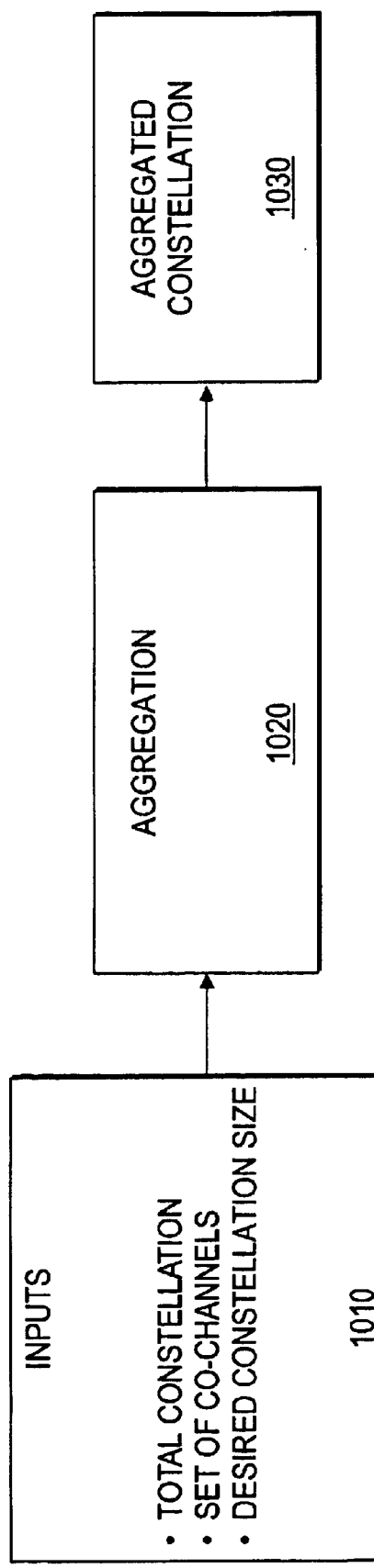
FIG. 10 illustrates a flow diagram of an aggregation method according to the concepts of the present invention.
Figure 11:
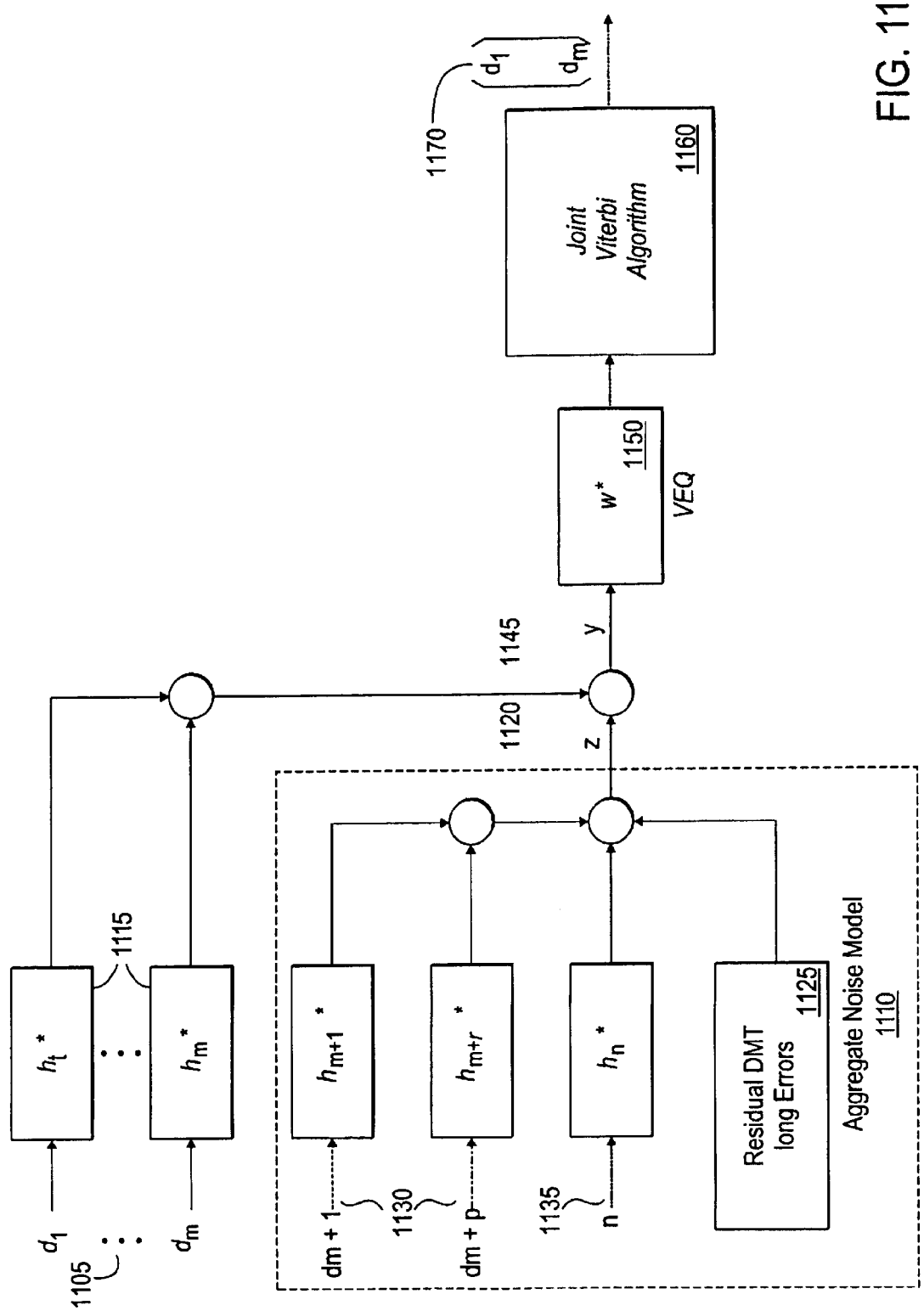
FIG. 11 illustrates a block diagram of a joint viterbi design according to yet another embodiment of the present invention.
Figure 12:
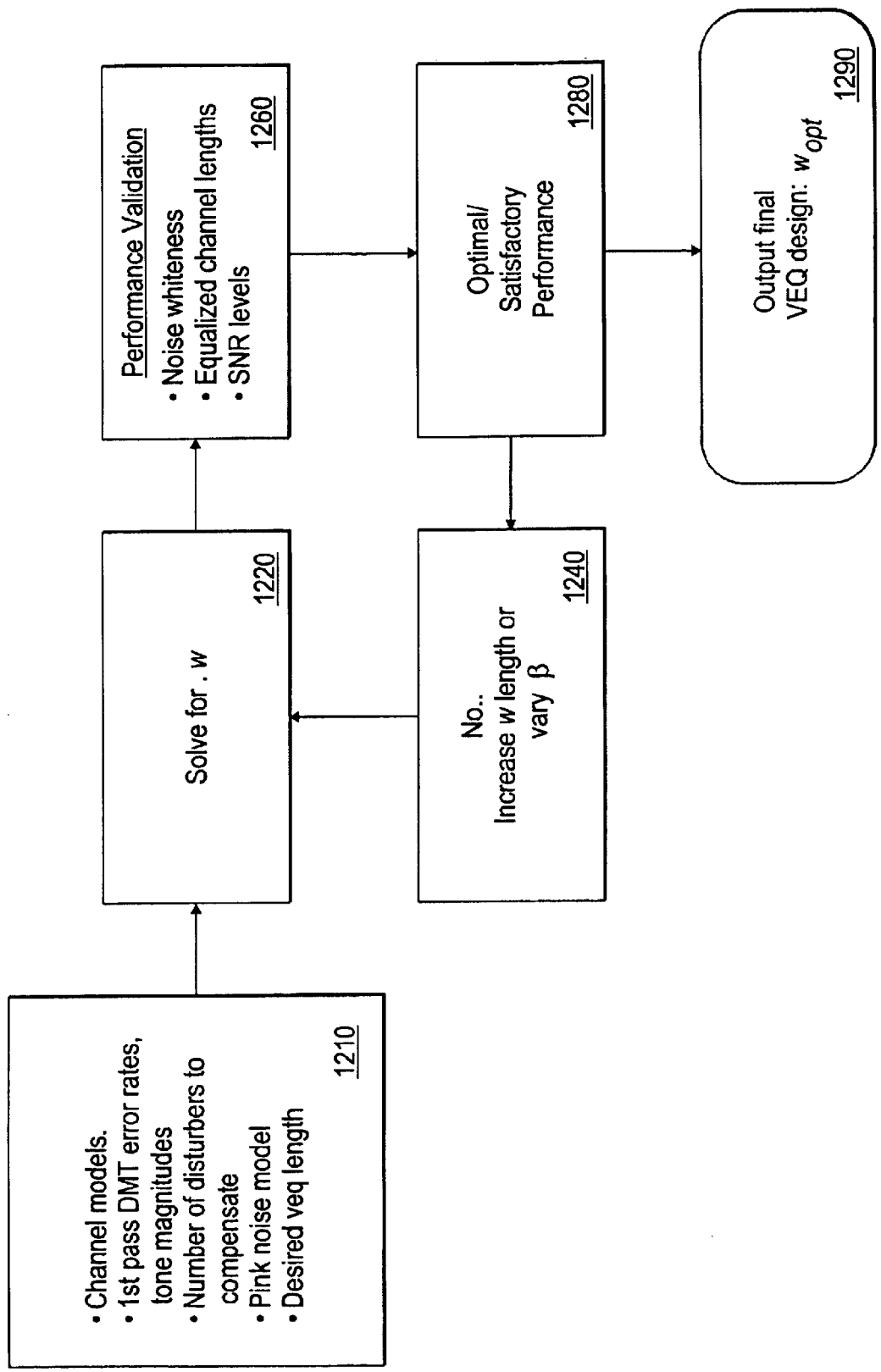
FIG. 12 illustrates a flow diagram of a viterbi equalizer design procedure according to the concepts of the present invention.

The compensation module 350 receives the initial co-channel estimations from the Identification Module 360 and the processed received signal from the standard receiver 300 and estimates a sequence of the disturber symbols for each of the disturbers that are chosen to be compensated. Then, this estimate of the disturber signal is subtracted from the main signal and the resulting compensated signal is passed on to the QAM decoder 362. The operation of the compensation module 350 is illustrated in FIG. 10, FIG. 11, and FIG. 12. Further, the compensation module 350 estimates a compensated SNR of the received signal which is necessary in determining the compensated bit loading performed by the bit loading module 370. The methods of determining the compensated SNR and the bit loading are later described with reference to FIG. 8 and FIG. 9. Finally, the signal is processed by a QAM (Quadrature Amplitude Modulation) decoder or slicer 362 in order to obtain the compensated main channel symbols q(n) 385.

It should be noted that FIG. 3 is meant to be illustrative and not limiting of the present invention. As such, other configuration may be used and other systems exhibiting interference and/or impairment problems may also benefit form the use of the present invention.

Received Signal Model

The signal received at the transceiver consists of a large number of components originating from the original DMT signal, the interference PAM signals, and noise. The received continuous time signal y(t) is represented by equation (1):

$$y(t) = y_{dmt}(t) + y_{pam}(t) + v(t), \qquad (1)$$

where $y_{dmt}(t)$ denotes the received DMT signal, $y_{pam}(t)$ denotes the received PAM signal and $v(t)$ denotes un-modeled noise.

1. DMT Signal Generation

Figure 4:
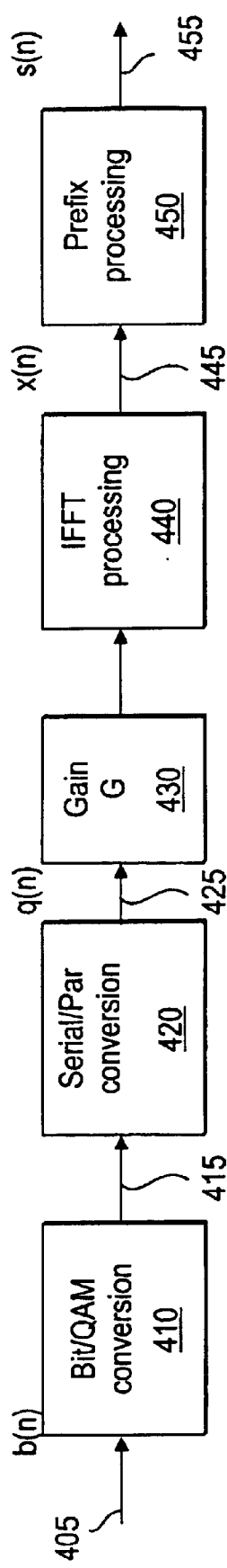
FIG. 4 illustrates a flow diagram of a method of generating a transmitted signal according to another embodiment of the present invention.

FIG. 4 illustrates a flow diagram of how the transmitted DMT signal is generated. It should be noted that the use of a DMT signal in conjunction with the present invention is only an example and the present invention may also be used with other types of signals. Block 410 represents the mapping process of the transmitted DMT signal b(n) 405 from bits to Quadrature Amplitude Modulation (QAM) symbols. At block 420, the output signal 415 of block 410 is then converted from a serial to a parallel configuration. For example, in one embodiment, the vectors are created of length 512, equal to the length of the DMT symbol. This operation is performed by selecting 223 elements out of 255 elements of the signal 415, prefixing them with 32 zeros, and conjugate them symmetrically, thus, extending the vector to 512 elements as shown in equation (2):

$$q(n)=[0,\ldots,0,q(223n),q(223n+1),\ldots,q(223n+222),0,\\ q^*(223n+222),\ldots,q^*(223n),0,\ldots 0]^T \quad (2)$$

At blocks 430 and 440, the vector q(n) 425 is then processed by a diagonal gain matrix G and an IFFT (Inverse Fast Fourier Transform) matrix F, respectively. The resulting signal x(n) 445 is given by equation (3):

$$x(n)=FGq(n), \quad (3)$$

where the diagonal gain matrix G is given by equation (4):

$$G=\text{diag}\{0,\ldots,0,g(0),\ldots,g(223),0,g^*(223),\ldots,\\ g^*(0),0,\ldots,0\} \quad (4)$$

and the IFFT matrix F is given by equation (5):

$$F=\frac{1}{N}\left\{e^{j\frac{2\pi}{N}km}\right\}k,m=0,\ldots,N-1 \quad (5)$$

where N=512. Finally, at block 450, a prefix of 32 samples is added to signal x(n) 445, resulting in the final transmitted vector s(n) 455 given by equation (6):

$$s(n)=\Pi_1 x(n), \quad (6)$$

where $$\Pi_1 = \begin{bmatrix} 0 & I_{32\times 32} \\ I_{512\times 512} & \end{bmatrix}$$

where I denotes the identity matrix. Finally, vector s(n) 455 is converted from parallel to serial resulting in the scalar transmitted signal s (nN+k)={s (n) }$_k$.

Figure 5:
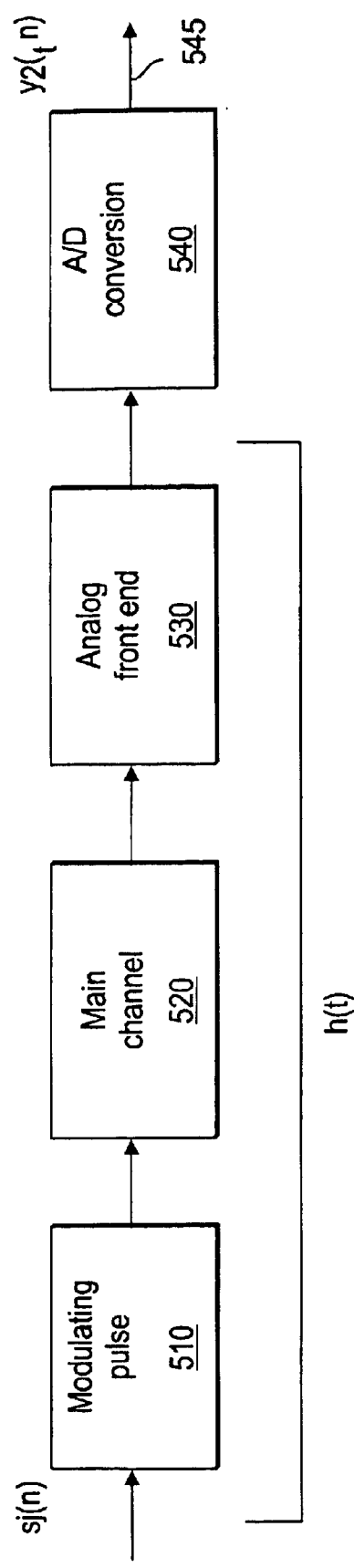
FIG. 5 illustrates a flow diagram of an exemplary transmission path of the received signal.

FIG. 5 illustrates the transmission path of the signal s(n) 455 through the modulating pulse 510, main channel response 520, and receiver filters such as analog front end filter 530. Thus, the received continuous time signal $y_{dmt}(t)$ is given by equation (7):

$$y_{dmt}(t)=\Sigma_{k=-\infty}^{\infty}s(k)h(t-kT_{dmt}) \quad (7)$$

where h(t) is the combined filter impulse response of blocks 510, 520, and 530. In one embodiment of the present invention, $T_{dmt}=1(2.208\times 10^6)$ sec. Finally, the received continuous time signal $Y_{dmt}(t)$ is sampled through the A/D converter at block 540, resulting in the signal $Y_{dmt}(n)$ 45 given by equation (8):

$$y_{dmt}(n)=y_{dmt}(t)|_{t=nT_{dmt}}=\upsilon_{k=-\infty}^{28}s(k)h(n-k)\|, \quad (8)$$

where h(n) is given by equation (9):

$$h(n)=h(t)|_{t=nT_{dmt}} \quad (9)$$

2. PAM Disturber Signal Model

The continuous time PAM disturber signal is given by equation (10):

$$y_{pam}(t)=\Sigma_{j=1}^{J}y_j(t), \quad (10)$$

where J denotes the number of disturbers that are explicitly modeled in the received signal. Each individual PAM signal $y_j(t)$ is given by equation (11):

$$y_j(t)=\Sigma_{k=-\infty}^{\infty}s_j(k)h_j(t-kT_j), \quad (11)$$

where $s_j(k)$ denotes the transmitted PAM sequence of the j-th disturber through an overall co-channel response $h_j(t)$ and with symbol period $T_j$.

The sampled signal $Y_{pam}(n)$ at the receiver is given by equation (12):

$$y_{pam}(n)=y_{pam}(t)|_{t=nT_{dmt}}=\Sigma_{j=1}^{J}y_j(n), \quad (12)$$

where $y_j(n)$ is given by equation (13):

$$y_j(n)=\Sigma_{k=-\infty}^{\infty}s_j(k)h_j(nT_{dmt}-kT_j) \quad (13)$$

In one embodiment of the present invention, the baud period Tj of each PAM disturber is assumed to be an integer multiple of the DMT baud period, i.e., $T_j=P_jT_{dmt}$, wherein Pj denotes an integer over-sampling factor. Hence the equation (13) becomes:

$$y_j(n)=\Sigma_{k=-\infty}^{28}s_j(k)h_j(n-kP_j) \quad (14)$$

where $h_j(n)$ is given by equation (15):

$$h_j(n)=h_j(t)|_{t=nT_{dmt}} \quad (15)$$

It should be noted that if the baud period Tj of each PAM disturber is not an integer multiple of the DMT baud period, the signal is resampled at a multiple of the PAM disturber baud rate.

3. Noise Signal Generation

The sampled noise signal is given by equation (16):

$$v(n)=v(t)|_{t=nT_{dmt}/P} \quad (16)$$

General Compensation Architecture

Figure 6:
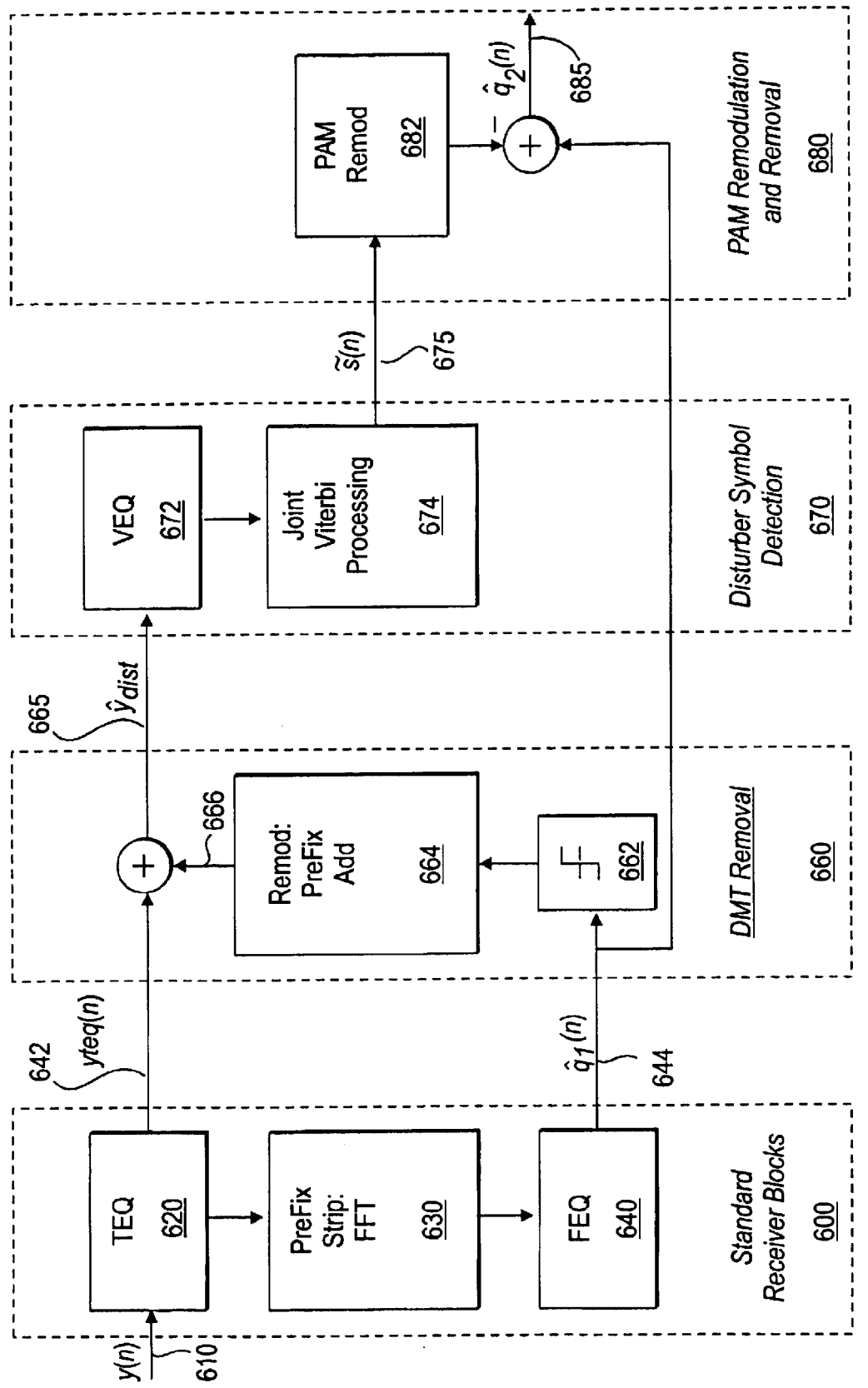
FIG. 6 illustrates a block diagram of a compensation architecture according to one embodiment of the present invention.

FIG. 6 illustrates a block diagram of the compensation architecture according to one embodiment of the present invention. In one embodiment and for ease of explanation, the compensation architecture includes four design modules: the standard receiver module 600, the DMT removal module 660, the disturber symbol detection module 670, and the PAM remodulation and removal module 680. The discrete time signal y(n) 610 is first received at the standard receiver block 600. The received signal 610 is first passed through the TEQ 620 resulting in the filtered signal $y_{teq}(n)$ 642. At block 630, the signal is further processed with a prefix strip and Fast Fourier Transform (FFT). The signal is then filtered through the FEQ 640, resulting in signal $q_1(n)$ 644.

1. DMT Removal Module

Since, in this embodiment, the channel identification operations are performed after the TEQ and FEQ training, the DMT signal has to be removed in order to obtain the aggregated disturbance signal.

The purpose of the DMT removal is to extract as much of the DMT component from the received signal as possible, to produce a signal $\hat{y}_{dist}$ 665 which consists mainly of cross-talk disturbance. This cross-talk disturbance signal can then be used to detect the disturber symbols $\hat{s}(k)$ 675.

The first step in the DMT removal is an initial (1st Pass) detection on the DMT symbols, as indicated by the slicer function 662. The 1st pass detection produces 256 symbols which are conjugated and modulated back into the time domain using an IFFT. It should be noted that, in one example, the IFFT results in a real vector of 512 points, 32 points less than a frame of the received vector y(n) 610. This loss of information is due to the cyclic prefix stripping operation 630 that occurs in the standard receiver block 600. At block 664, after the remodulation operation, this cyclic prefix is added back to the vector, and the time vector then filtered through the equalized main channel $\hat{h}_{teq}$. The resulting signal 666 is then subtracted from the TEQ filtered signal $y_{TEQ}(n)$ 642 to form signal $\hat{y}_{dist}(n)$, the 1st pass estimation of the disturbance signal:

$$\hat{y}_{dist}(n) = y_{TEQ}(n) - \hat{y}_{DMT}(n) \tag{17}$$

A more detailed description of a DMT removal procedure is described below in the "System Transmission Time Phase" portion of the present application and, in particular, in the section entitled "DMT Removal".

2. Disturber Symbol Detection Module

The output vector $\hat{y}_{dist}(n)$ 665 from the DMT Removal module 660 is then passed to the VEQ 672 and Joint Viterbi Algorithm 674, resulting in a vector estimate 675 of the disturber symbols $\tilde{s}(n)$. The VEQ is an FIR filter that preconditions the vector $\hat{y}_{dist}(n)$ 665, shortens the co-channels, and improves the SNR of the disturber signal. The Joint Viterbi Algorithm 674 processes the received vector for multiple disturbance symbols simultaneously by using a search routine based on the maximum likelihood function.

In another embodiment of the present invention, the disturber symbols may be detected using a Multiple Input Multiple Output DFE (Decision Feedback Equalizer). This embodiment will be described below in the section entitled "Alternative to VEQ Design".

3. PAM Remodulation and Removal

The compensation vector is constructed by modulating the detected set of disturber symbols $\tilde{s}(k)$ 675 through the co-channel models, converting this signal to the frequency domain using FFT, and applying the FEQ scaling. The compensation vector is then subtracted from the original vector $\hat{q}_1(n)$ 644, as illustrated in FIG. 6. The resulting signal $q_2(n)$ 685 represents the compensated received signal. A more detailed description of the PAM remodulation and removal module is described below in the "System Transmission Time Phase" portion of the present application and, in particular, the section entitled "PAM Remodulation and Removal".

Figure 7:
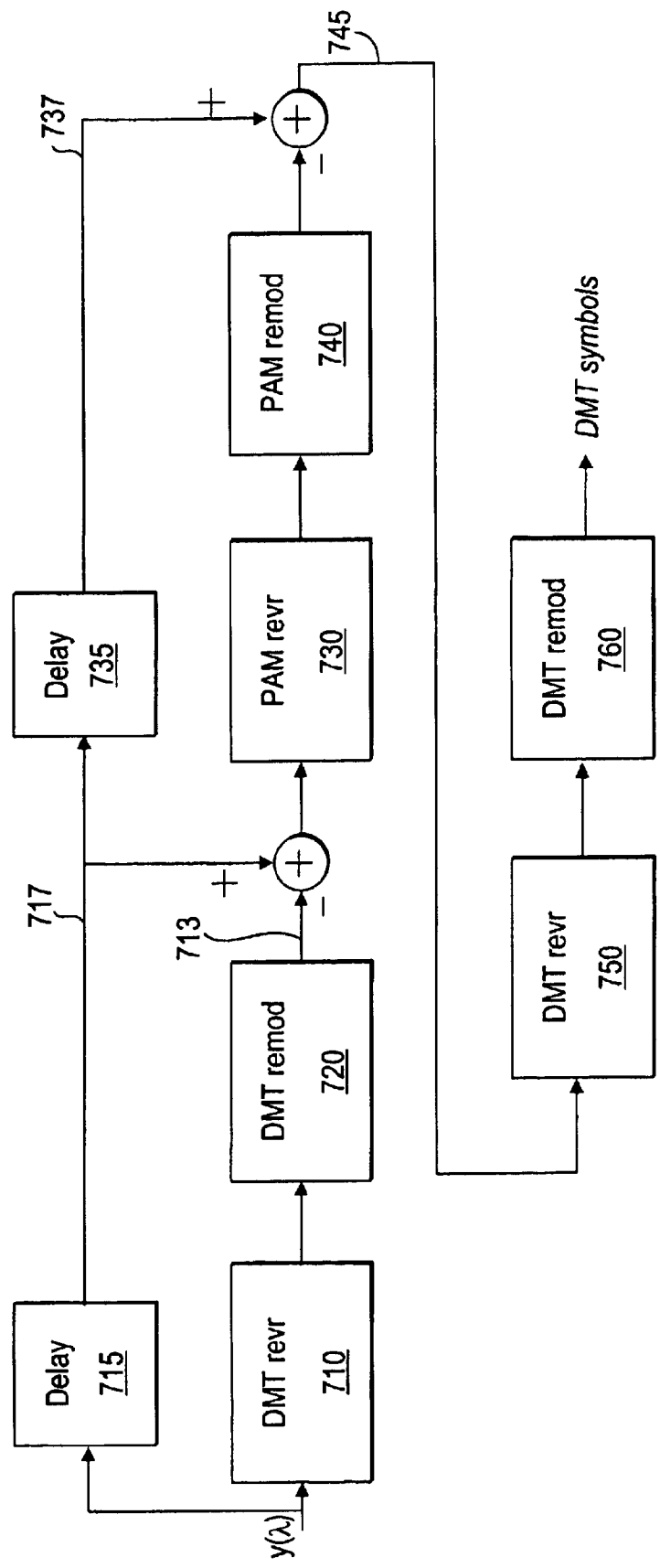
FIG. 7 illustrates a flow diagram of a successive signal cancellation scheme according to one embodiment of the present invention.

In a successive cancellation architecture of one embodiment of the present invention, signal $q_2(n)$ 685 is passed through a second slicer (2nd pass) in order to get the compensated DMT symbols. FIG. 7 illustrates a successive cancellation compensator architecture. The received, uncompensated signal y(k) 700 is first detected by a DMT receiver 710 and then it is remodulated by a DMT remodulator 720 (first pass detection). The resulting signal 713 is subtracted from the signal 717, which represents the original signal y(k) delayed by a delay 715. The resulting disturbance signal is then detected by a PAM receiver 730, remodulated by a PAM remodulator 740, and subtracted from the delayed received signal 737. The resulting DMT signal is again detected by a DMT receiver 750 and remodulated by a DMT remodulator 760 (second pass detection). As such, using a successive cancellation scheme the final DMT symbols 770 are detected. It will be appreciated that the successive cancellation scheme disclosed herein may be used with both time domain remodulation and frequency domain remodulation. Further, other cancellation schemes may be used to detect the DMT symbols, such as: joint detection of the PAM and DMT symbols or frequency domain subspace cancellation.

System Design Phase

1. Determination of Bit-Loading Parameters

The effectiveness of the compensation method disclosed herein is negatively affected as the rate of the first-pass DMT errors increases. Thus, a certain bit loading rate needs to be determined to yield an acceptable first-pass DMT error rate and, at the same time, produce the desired bit rate or margin improvement. Thus, a method for computing the bit loading and gains to be used in a cross-talk compensation architecture is disclosed.

The method disclosed herein satisfies both the first-pass and second-pass requirements. Since the second-pass requirements depend on the compensated SNR, that SNR has to be computed before the transceiver goes into data transmission operation. However, in one embodiment of the present invention, compensation does not occur until transmission time. Thus, in this embodiment, the compensated SNR must be predicted before compensation takes place using the SNR of the PAM receiver as the reference point. In order to determine the compensated SNR, the amount of energy of the PAM disturbers that may be removed by the compensation method disclosed herein must be predicted.

Compensated SNR Computation

In one embodiment of the present invention, during the training phase of the compensation method, the uncompensated per-bin SNR $S_1$ at the output of the first-pass DMT receiver is first determined. Further, $D_1^{tot}$, the Power Spectral Density (PSD) of the total noise at the first-pass DMT receiver, and the PSD of each PAM disturbers to be compensated for, are also determined. The total PSD of the compensated and uncompensated disturbers is then determined using equations (18) and (19):

$$D_c^{PAM} = \sum_{compensated} D_i^{PAM} \tag{19}$$

$$D_r^{PAM} = \sum_{uncompensated} D_i^{PAM} \tag{18}$$

where $D_c^{PAM}$ denotes the PSD of the PAM disturbers to be compensated for and $D_r^{PAM}$ denotes the PSD of the remaining PAM disturbers (not compensated). The sum $D^{PAM}$ of the PSDs of the PAM disturbers is then calculated using equation (20):

$$D^{PAM} = D_c^{PAM} = D_r^{PAM} \tag{20}$$

The PSD of the white noise $D_n$ is thus given by equation (21):

$$D_n = D_1^{tot} - D^{PAM} \tag{21}$$

For a computed compensated SNR $S_2$, the corresponding compensated bit loading $b_2$ for each bin is given by equation (22):

wherein $\Gamma$ denotes a user-defined parameter based on a desired bit error rate.

$$b_2 = \log_2\left(1 + \frac{s_2}{\Gamma}\right) \tag{22}$$

This bit loading will result in first-pass DMT errors with a probability $P_e^{DMT}{}_1$ that is approximated by equation (23):

$$P_e^{DMT_1} = 1 - \left[1 - 2Q\left(\sqrt{\frac{3 S_1}{2^{b_2} - 1}}\right)\right]^2 \quad (23)$$

The PSD of the first-pass DMT errors $D_e^{DMT}{}_1$ is therefore given by equation (24):

$$D_e^{DMT_1} = P_e^{DMT_1} D^{DMT} = P_e^{DMT_1} S_1 D_1^{tot} \quad (24)$$

Thus, the total noise at the input of the PAM receiver $D_n^{PAM}$ is given by equation (25):

$$D_n^{PAM} = D_e^{DMT_1} + D_r^{PAM} + D_n \quad (25)$$

The (scalar) SNR $S_p$ of the PAM receiver is then computed as the ratio of the total power of the compensated PAM disturbers $W_c^{PAM}$ over the total power of the noise at the input of the PAM receiver $W_n^{PAM}$, which is illustrated in equation (26):

$$S_p = \frac{W_c^{PAM}}{W_n^{PAM}}, \quad (26)$$

$$W_c^{PAM} = \int_{\omega_1}^{\omega_2} D_c^{PAM}(\omega) d\omega,$$

$$W_n^{PAM} = \int_{\omega_1}^{\omega_2} D_n^{PAM}(\omega) W(\omega) d\omega,$$

where the integration of the PSDs takes place over the frequency interval ($\omega 1$, $\omega 2$) where the compensated PAM disturber PSD is nonzero, and $W(\omega)$ denotes a weighting function that accounts for the fact that the PAM receiver has different noise sensitivity in different parts of the PAM spectrum.

Utilizing the SNR determined in equation (26), the probability of error of the PAM receiver (for 2B1Q disturbers) is approximated by the equation (27):

$$P_e^{PAM} = \frac{3}{2} Q\left(\sqrt{\frac{2}{5} S_p}\right) \quad (27)$$

Using the probability of error found in equation (27), the PSD of the compensated PAM disturber that is not removed by compensation by the PSD of the errors made by the PAM receiver is determined by equation (28):

$$D_e^{PAM} = P_e^{PAM} D_c^{PAM} \quad (28)$$

Finally, the corresponding compensated per-bin SNR $S_2$ is computed using equation (29):

$$S_2 = \frac{D^{DMT}}{D_1^{tot} - D_c^{PAM} + D_e^{PAM}} = \frac{D^{DMT}}{D_n + D_r^{PAM} + D_e^{PAM}} \quad (29)$$

It should be noted that the compensated SNR $S_2$ is a vector-valued function in the case of DMT receivers. Therefore, in order to optimize the search over the values of $S_2$, a vector-valued search method may be used. In one embodiment of the present invention, a computationally efficient method utilizes the scalar SNR $S_p$ of equation (26) at the input of the PAM receiver as the argument for the search minimization.

Figure 8:
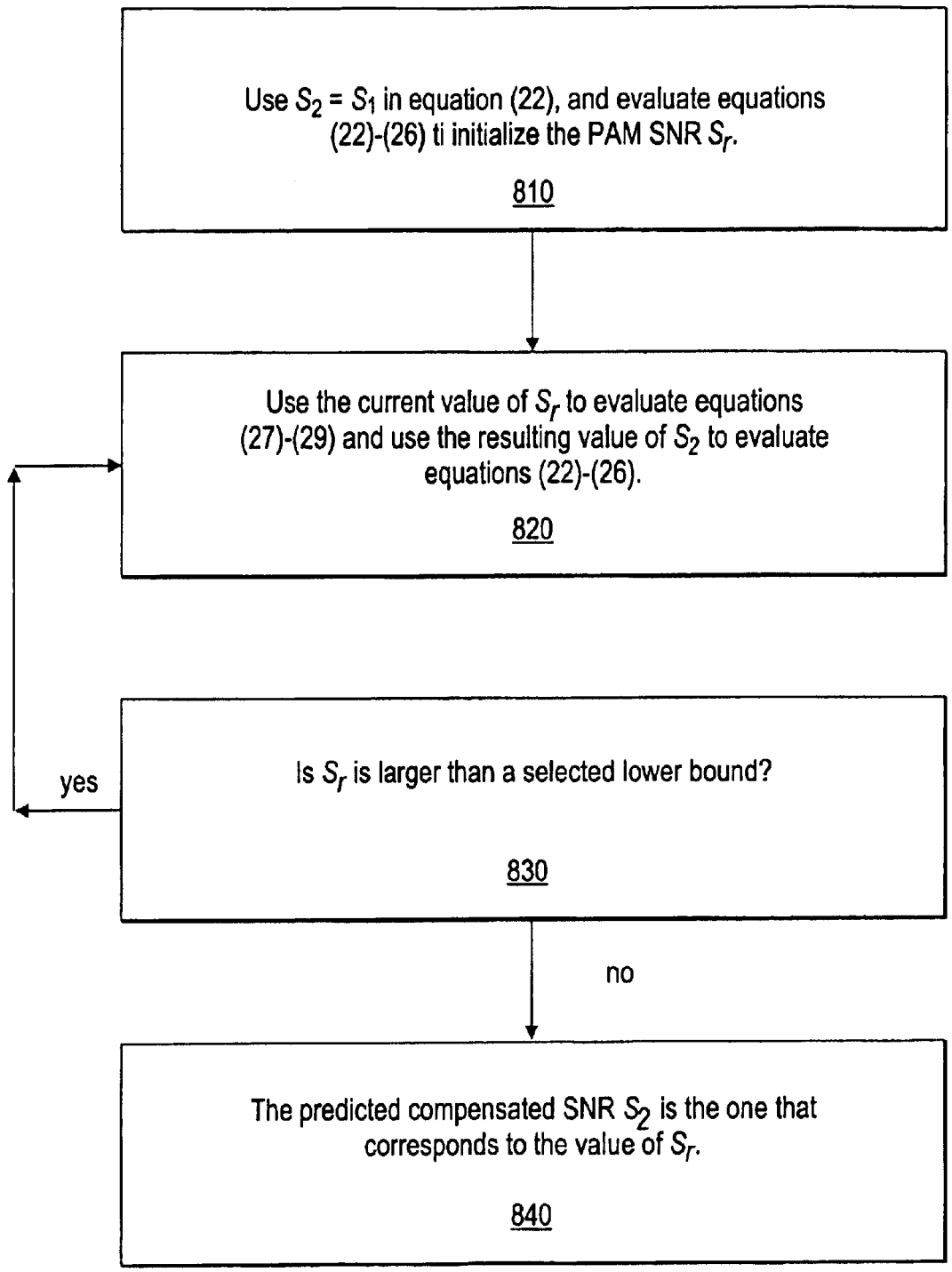
FIG. 8 illustrates a flow diagram of a method for determining a compensated signal-to-noise ratio according to yet another embodiment of the present invention.

The search method for the values of $S_2$ is illustrated in FIG. 8. At step 810, the compensated SNR $S_2$ at the output of the second pass receiver is considered to be equal to the uncompensated SNR $S_1$ at the output of the first-pass receiver. Further, the equations (22)–(26) are evaluated to initialize the PAM SNR $S_p$. This initial value is the one resulting from the uncompensated bit loading, and therefore it represents an upper bound for the value of $S_p$. At step 820, equations (27)–(29) are evaluated using the current value of $S_p$. The resulting value of $S_2$ from equation (29) is then used to evaluate equations (22)–(26) and determine the scalar SNR of the PAM receiver $S_p^f$. If it is found at step 830 that $S_p$ is larger than a selected lower bound (for example, −20dB), the value of $S_p$ is reduced and step 820 is repeated until $S_p$ has reached a lower bound. Finally, at step 840 it is determined that the predicted compensated SNR $S_2$ is the one that corresponds to the value of $S_p$ that resulted in the smallest discrepancy $|S_p^f - S_p|$.

2. Disturber Ranking

In one embodiment of the present invention, the disturbers selected for compensation are the ones deemed to create the most interference. In order to evaluate which are the most offending disturbers, the compensated SNR method illustrated in FIG. 8 is run several times in succession, once for each identified disturber. The disturbers are then ranked according to the SNR improvement their removal would produce on the main channel.

3. Bit Loading and Gain Selection

Compensated Bit Loading

After the disturber ranking procedure is completed, the highest-ranked disturbers are selected for compensation, i.e., the disturbers with the highest compensated SNR. The compensated SNR procedure illustrated in FIG. 8 is repeated, this time using the disturbers that are selected for compensation. This produces a predicted compensated SNR $S_2$ given by equation (29) and a corresponding predicted compensated bit loading b2 given by equation (22).

Viterbi Limit

In one embodiment of the present invention, the PAM receiver uses a Viterbi maximum-likelihood sequence estimator (MLSE). The compensated SNR method described above does not account for the fact that the performance of the Viterbi MLSE depends $$b_V = \log_2\left(1 + \frac{S_1}{\Gamma_V}\right) \quad (30)$$

nonlinearly on the first-pass DMT errors and deteriorates significantly when the first-pass DMT bit error rate (BER) is higher than a specific given value. Therefore, a "Viterbi limit" on the compensated bit loading is determined to ensure that the BER is not exceeded. The Viterbi-limited bit loading $b_V$ is determined using equation (30):

wherein the $\Gamma_V$ denotes a threshold based on the desired first-pass DMT bit error rate.

Final Bit Loading

The final bit loading is determined by comparing the predicted compensated bit loading $b_2$ given by equation (22) and the Viterbi-limited bit loading given by equation (30) on a bin-by-bin basis, selecting the smallest of the two for each bin, and then rounding to the $$b_f = \lfloor \min(b_2, b_V) + 0.5 \rfloor \quad (31)$$

nearest bin. This can be expressed through equation (31): where the floor brackets indicate the integer part of the argument, and the minimum operation is performed on a bin-by-bin basis.

Final Gain Selection

In a bit loading method for a DMT modem, the gain for each bin is chosen so that the resulting SNR will yield the desired BER for the selected bit constellation on this bin. Since the upper bound on the BER is expressed through the parameter $\Gamma$ and the SNR before the gain is denotes as S, gain g that corresponds to the bit loading b is given by equation (32):

$$g = \frac{\Gamma}{S}(2^b - 1) \quad (32)$$

In one embodiment of the present invention, it is desirable to have the final gain $g_f$ satisfy two conditions. As the first condition, the final gain has to guarantee that with the bit loading selected in equation (31), the BER of the first-pass receiver does not exceed the $$g_f \geq g_{f1} = \frac{\Gamma_V}{S_1}(2^{b_f} - 1) \quad (33)$$

Viterbi limit prescribed by $\Gamma_V$. Since the SNR at the first-pass DMT receiver is equal to the measured uncompensated SNR $S_1$, this condition is expressed by equation (33):
As the second condition, the final gain $g_f$ has to guarantee that with the bit loading selected in (31), the BER of the second-pass receiver does not exceed the limit prescribed by $\Gamma$. Since the SNR at the second-pass DMT receiver is predicted to be the compensated SNR $S_2$, this condition is expressed by equation (34):

Thus, in this embodiment, the final gain is selected to satisfy both equations (33) and $$g_f \geq g_{f2} = \frac{\Gamma}{S_2}(2^{b_f} - 1) \quad (34)$$

Figure 9:
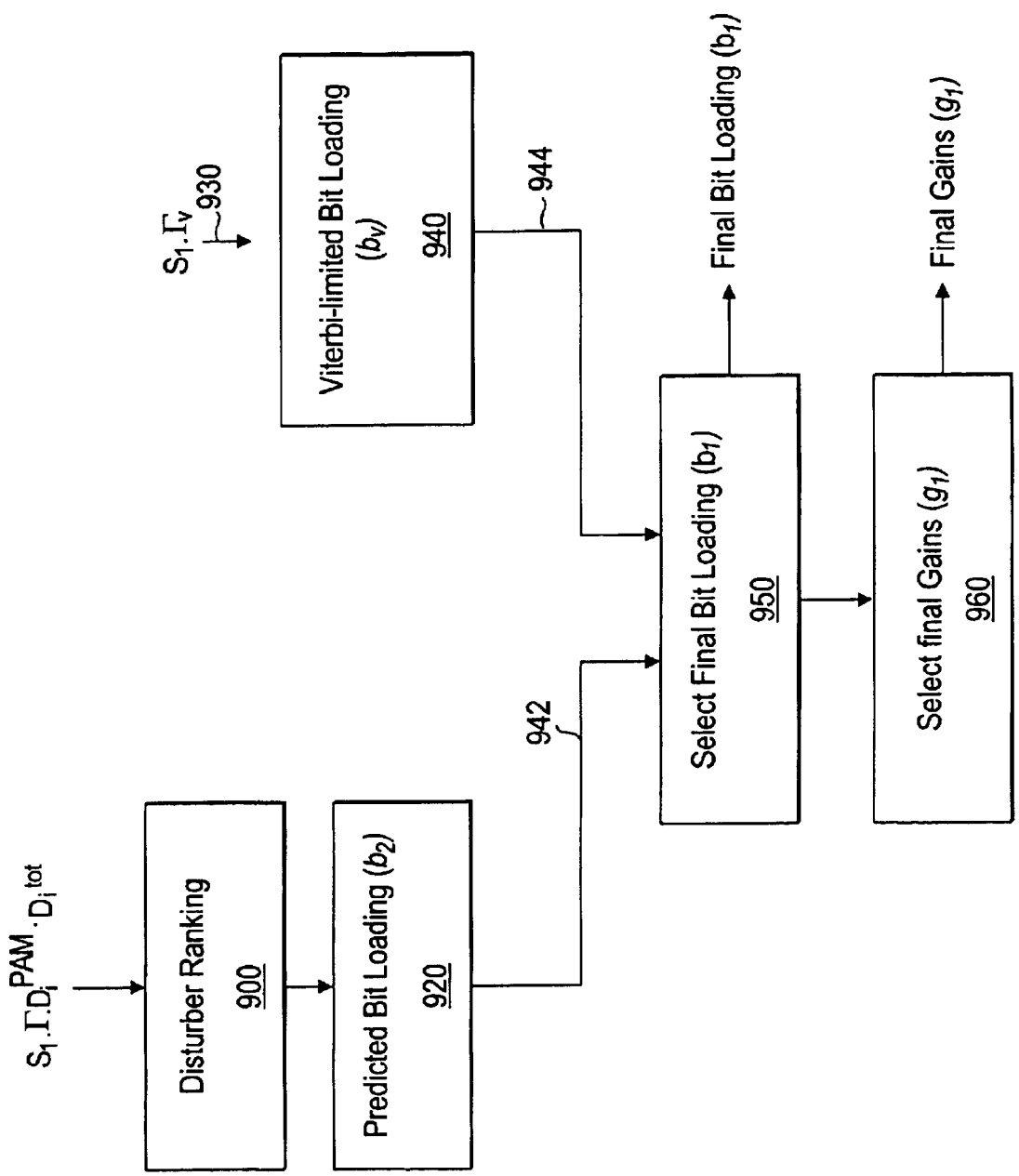
FIG. 9 illustrates a flow diagram of a bit loading method according to yet another embodiment of the present invention.

(34) and the final gain chosen to be the maximum value of $g_{f1}$ and $g_{f2}$. Thus, the final gain $$g_f = \max(g_{f1}, g_{f2}) \quad (35)$$

of this embodiment gf is given by equation (35):

FIG. 9 is a flowchart of the compensated SNR and bit loading methods. Using the predetermined inputs 900, the disturbances are first ranked at step 910 in the order of how they affect the bit loading. At step 920, the highest ranked disturbers are selected for compensation and a predicted compensated bit loading $b_2$ 942 is determined using the method illustrated in FIG. 8. Further, using the uncompensated SNR and the SNR threshold 930, a Viterbi-limited bit loading $b_V$ 944 is determined at step 940. The final bit loading is then determined at step 950 by comparing $b_2$ 942 with $b_V$ 944 on a bin-by-bin basis and selecting the smallest of the two for each bin. Lastly, at step 960, the final gain $g_f$ is determined.

Disturber Receiver Design

1. Constellation Aggregation

In order to determine the estimates of the disturber symbols $s_i(n)$ of cross-talk interference, the joint Viterbi algorithm (JVA) may be used. In one alternative embodiment of the present invention, a MIMO (Multiple Input Multiple Output) DFE (Decision Feedback Equalizer) method may be used as well. A MIMO DFE method is described below with reference to FIGS. 16 and 17.

The computational load incurred by the JVA makes it difficult to implement when more than two disturbers are present. In order to take advantage of the optimality of the JVA while reducing its complexity, i.e., its number of states, constellation aggregation may be performed. Since it is desirable to identify the combined effect of all the disturbers instead of the contribution of each individual PAM disturber, it is more effective to find an approximated signal constellation set with a much smaller size for all PAM disturbers by minimizing the approximation error or distortion thus introduced. It should be noted that, according to one embodiment of the present invention, constellation aggregation is performed during the design phase of the compensation architecture.

The signal model y(n) of PAM disturbers $s_i(n)$, i=1, ..., M, is given by equation (36):

$$y(n) = \sum_{i=1}^{M} \sum_{k=1}^{L} s_i(k) h_i(n-k), \ L = \max_i L_i, \quad (36)$$

where M PAM disturbers symbols are all chosen from the same alphabet set of size A, $h_i(n)$ denote the corresponding impulse responses of the M channels with order $L_i$, and y(n) is the summation of M overlapping pulses.

The received signal signatures $g_k(n)$ and $\underline{g}_k$ due to the transmitted PAM symbol at a given time k, $s_i(k)$, are given by equations (37a) and (37b):

$$g_k(n) = [s_1(k) \ldots s_M(k)] \begin{bmatrix} h_1(n) \\ \vdots \\ h_M(n) \end{bmatrix} \quad (37a)$$

$$\underline{g}_k = [g_k(0) \ldots g_k(L)] \quad (37b).$$

Because the vector $[s_1(k) \ldots s_M(k)]$ has $N=A^M$ combinations, $\underline{g}_k$ can take one of N values. With the definition of $g_k(n)$, equation (36) may be re-written as:

$$y(n) = \sum_{k=0}^{L} g_k(n-k). \quad (38)$$

Next, the aggregated $\tilde{g}_k(n)$ with $\underline{\tilde{g}}_k = [\tilde{g}_k(0) \ldots \tilde{g}_k(L)]$ taking N' values (N'<N) is determined such that the cost given by equation (39) is minimized.

$$C = \sum_n |y(n) - \tilde{y}(n)|^2 \quad (39)$$

Similar to y(n), $\tilde{y}(n)$ is defined by equation (40):

$$\tilde{y}(n) = \sum_{k=0}^{L} \tilde{g}_k(n-k). \quad (40)$$

Expanding the cost function of equation (39) leads to $$C = \sum_n \left| \sum_{k=0}^{L} [g_k(n-k) - \tilde{g}_k(n-k)] \right|^2 \leq \quad (41)$$

$$\alpha \sum_n \sum_{k=0}^{L} |g_k(n-k) - \tilde{g}_k(n-k)|^2,$$

where $\alpha$ is a scalar. Assuming that $g_k(n-k) \neq 0$ for n=k,k+1, ... k+L, the above cost may be expressed by equation (42):

$$C = \sum_{k=0}^{L} \|\underline{g}_k - \underline{\tilde{g}}_k\|^2. \quad (42)$$

It should be noted that $\underline{g}_k$ has N possibilities which can be denoted as a set $G=\{\underline{g}^{(j)}\}_{j=1}^{N}$, where each $\underline{g}^{(j)}$ in the set corresponds to one such possible value. Similarly, there is an aggregated set $\tilde{G}=\{\underline{\tilde{g}}^{(j)}\}_{j=1}^{N'}$ and $\underline{\tilde{g}}_k \in \tilde{G}$. Thus, to minimize the original cost is equivalent to minimize the following function given by equation (43):

$$C = \sum_{j=1}^{N} \|\underline{g}^{(j)} - \underline{\tilde{g}}^{(j_k)}\|^2, \quad (43)$$

where $\underline{\tilde{g}}^{(j_k)}$ represents the corresponding aggregation from $\underline{g}^{(j)}$. Thus, the aggregation method involves a clustering method which dictates that the optimal cluster centers $\underline{\tilde{g}}^{(k)}$ are centroids. Specifically, a point in the original cluster $\underline{g}^{(j)}$ is given by equation (44):

$$\underline{g}^{(j)} = [s_1^{(j)} \ldots s_M^{(j)}] \begin{bmatrix} \underline{h}_1 \\ \vdots \\ \underline{h}_M \end{bmatrix} \quad (44)$$

where $\underline{h}_i = [h_i(0) \ldots h_i(L)]$ $(i=1, \ldots, M)$.

Thus, the aggregated constellation point with $$\tilde{s}_i(k) = \frac{1}{N_k} \sum_{j_k=1}^{N_k} s_i^{(j_k)}$$

represents the centroid equivalence given by equation (45):

$$\underline{\tilde{g}}^{(k)} = \frac{1}{N_k} \sum_{j_k=1}^{N_k} \underline{g}^{(j_k)} = \left(\frac{1}{N_k} \sum_{j_k=1}^{N_k} [s_1^{(j_k)} \ldots s_M^{(j_k)}]\right) \begin{bmatrix} \underline{h}_1 \\ \vdots \\ \underline{h}_M \end{bmatrix} = \underline{\tilde{s}}(k) \begin{bmatrix} \underline{h}_1 \\ \vdots \\ \underline{h}_M \end{bmatrix}, \quad (45)$$

where $\underline{\tilde{s}}(k) = [\tilde{s}_1(k) \ldots \tilde{s}_M(k)]$ and $N_k$ is the number of points in the N-cluster aggregating to $\underline{\tilde{g}}^{(k)}$ in the N'-cluster.

Given a set of (initial) centroids $\underline{\tilde{g}}^{(j)}$, $\underline{g}^{(j)}$ may be assigned to the centroid $\underline{\tilde{g}}^{(j_k)}$ such that the distance $$d_k = \|\underline{g}^{(j)} - \underline{\tilde{g}}^{(k)}\|^2 \quad (46)$$

is minimized. Subsequently, based on the current cluster assignment, the centroids given by equation (47) may be recalculated:

$$\underline{\tilde{s}}^{(k)} = \frac{1}{N_k} \sum_{j=1k}^{N_k} s^{(j_k)}. \quad (47)$$

It should be noted that the above cluster assignment and centroid recalculation can be processed iteratively until convergence. It will be appreciated that using the aggregation method disclosed herein, the size of constellation may be greatly reduced while the aggregation error is limited within an allowable range. For example, for five 4-PAM disturbers, the input signal can take one of $4^5=1024$ combinations. However, using the aggregation method disclosed herein, a reduced constellation set of 16 points may be obtained with only minimal power lost. It should be noted that, according to one alternative embodiment of the present invention, a K-means clustering method may be applied to perform the constellation aggregation.

FIG. 10 is a flow diagram of the aggregation method. The inputs 1010 of the aggregation function are: the (original) constellation $C \in R^{R \times M}$ to be aggregated (C is formed from set S), the channel impulse response matrix, and the desired constellation size. During the aggregation process 1020, the aggregated constellation $\tilde{C} \in R^{N' \times M}$ 1030 are generated from set $\tilde{S}$ and the percentage of distortion introduced due to the aggregation process is determined.

2. VEQ Design and Channel Shortening

As illustrated in FIG. 6, the VEQ is an FIR filter that preconditions the vector $\hat{y}_{dist}(n)$ 665 of FIG. 6. The VEQ method disclosed herein shortens the co-channels to a user-selected length so that the joint Viterbi algorithm (JVA) can operate efficiently with a minimum number of computational operations. Furthermore, the VEQ enhances performance of the joint Viterbi, thus increasing SNR at the input.

The JVA 674 processes the received vector for multiple disturbance symbols simultaneously by using a search routine based on the maximum likelihood sequence estimate (MLSE) for a symbol sequence. Typically, the JVA performance may be degraded by additive noise that does not have a flat spectrum, but has significant correlation, thus leading to symbol detection errors. Also, when the symbols are sent through a channel with a long impulse response (i.e., having many taps) the number of operations (multiplications, additions, etc.) required to implement the VA could become prohibitive. This constraint becomes even more problematic in the case of the JVA, when multiple communication paths are decoded simultaneously, since the number of operations grows exponentially with the number of channels. Thus, if either the white noise or short channel length assumption is not satisfied, effective use of the JVA may not be possible. In these cases, pre-filtering, or equalization of the JVA input signal may be necessary. Thus, a method to jointly optimize this filter (or equalizer) design and the JVA path metrics that can approximate optimality conditions and enable a pragmatic JVA implementation is disclosed herein.

FIG. 11 illustrates a joint Viterbi algorithm. The symbols to be detected $d_1, \ldots, d_m$ 1105 are passed through the corresponding channels $h_1, \ldots, h_m$ 1115. Noise signal z 1120 is added to the output of these channels to produce the signal y 1145 at the receiver. It should be noted that signal y 1145 may be oversampled, thus improving the effectiveness of the VEQ design.

In general, the noise z 1120 may be comprised of several signal components. When the Viterbi is used for cross-talk compensation for a DMT DSL modem, this noise may consist of colored noise ($h_n * n$) 1135, other disturber channels ($h_{m+1} * d_{m+1} + \ldots + h_{m+p} * d_{m+p}$) 1130, and residual tones 1125 that result from first pass DMT errors. These different sources of noise may be included in the VEQ design in the manner described by equations (23)–(25).

It should be noted that the total noise, including noise signals 1130 and 1135 of FIG. 11, may be modeled by an aggregate source $\bar{n}$. The aggregate source $\bar{n}$ is passed through a shaping filter $\bar{h}$ so that the spectrum of the received noise closely matches that of a particular noise environment. The filter $\bar{h}$ is chosen to capture the aggregate spectrum of the total noise signal z 1120.

The purpose of the JVA 1160 is to process the received signal y 1145 and decode the sent symbols, thus producing estimated values $\hat{d}_1, \ldots, \hat{d}_m$ 1170. However, when noise shaping introduced by the channel $\bar{h}$ is significant, or when the co-channel models $h_1, \ldots, h_m$ 1115 have an excessive number of taps, proper functioning of the JVA can be pragmatically prohibitive.

VEQ Design

FIG. 12 illustrates a VEQ filter design procedure according to one embodiment of the present invention. Step 1210 is the initial set-up phase during which the design parameters are selected. The design parameters include: $n_h$, the desired channel lengths for co-channels, $n_{\bar{h}}$, the aggregate (correlated) noise channel, $n_w$, the VEQ filter length, the number of disturbers to compensate, and the first-pass DMT error rates and tone magnitudes.

Further, a relative weight $\beta \in [0,1]$ is selected to allow a design trade-off between noise whitening and channel shortening. For example, to achieve all noise whitening without shortening co-channels, the relative weight may be set at the value of 1. To shorten co-channels without regard to noise correlation, the relative weight may be selected as $\beta=0$.

Next, channel convolution matrices $H_i, i=1, \ldots, m$, and noise correlation filter matrix, $\bar{H}$ are formed. It should be noted that these matrices can be formed in either row or column form. In one embodiment of the present invention, these matrices are coded with the channel impulse on the columns, as given by equation (48a):

$$H_i = \begin{bmatrix} h_1^i & 0 & & \\ h_2^i & h_1^i & & \\ \vdots & h_2^i & h_1^i & \\ 0 & \vdots & \vdots & \\ & & & h_1^i \end{bmatrix}, \quad (48a)$$

where each matrix has dimension $R^{(n_h i + n_w - 1) \times n_w}$, where $n_{h^i}$ is the length of the $i^{th}$ co-channel, and $n_w$ is the specified length of the equalizer.

The co-channels may be normalized as illustrated in equation (48b), so that the effective shortening can be carried out evenly over the co-channels, and the relative weighting $\beta$ is a more meaningful trade-off parameter.

$$h_i = h_i / \|h_i\|_2 \quad (48b)$$

At step 1220, the viterbi equalizer w is solved using a joint least squares method as illustrated in equation (49). It should be noted that a singular value decomposition method may be used to solve for the equalizer w.

$$\begin{bmatrix} (1-\beta) \begin{bmatrix} H_1^r \\ \vdots \\ H_m^r \end{bmatrix} \\ \beta \bar{H}^r \end{bmatrix} w = \begin{bmatrix} e_{\delta+1}^1 \\ \vdots \\ e_{\delta+1}^m \\ e_{\bar{\delta}+1}^{m+1} \end{bmatrix}. \quad (49)$$

Matrices $H_i^r, i=1, \ldots, m$, and $\bar{H}^r$ are the reduced matrices that are derived from channel convolution matrices $H_i, i=1, \ldots, m$, and noise correlation matrix, $\bar{H}$, by removing $n_h - 1$ rows and $n_{\bar{h}} - 1$ rows, respectively, that correspond to the desired windows of co-channel response. This process is performed for a given pair of delays $\delta$ (for the co-channels) and $\bar{\delta}$ (for the composite noise channel). Equations (50a) and (50b) illustrate the matrix row removal process, according to one embodiment of the present invention.

$$H_i = \begin{bmatrix} H_i(1:\delta, :) \\ H_i(\delta+1:\delta+n_h, :) \\ H_i(\delta+n_h+1:\text{end}, :) \end{bmatrix}, \text{ and } \bar{H} = \begin{bmatrix} \bar{H}(1:\bar{\delta}, :) \\ \bar{H}(\bar{\delta}+1:\bar{\delta}+n_{\bar{h}}, :) \\ \bar{H}(\bar{\delta}+n_{\bar{h}}+1:\text{end}, :) \end{bmatrix} \quad (50a)$$

$$H_i^r = \begin{bmatrix} H_i(1:\delta+1, :) \\ H_i(\delta+n_h+1:\text{end}, :) \end{bmatrix}, \text{ and } \bar{H}^r = \begin{bmatrix} \bar{H}(1:\bar{\delta}+1, :) \\ \bar{H}(\bar{\delta}+n_{\bar{h}}+1:\text{end}, :) \end{bmatrix} \quad (50b)$$

for $i=1, \ldots, m$, by stripping out the middle matrices that consist of $n_h - 1$ and $n_{\bar{h}} - 1$ rows, respectively.

In addition, vectors $e_{\delta+1}^i$ are unit vectors of length equal to the number of rows in $H_i^r$, with the $\delta+1$ element, corresponding to the beginning of the desired window, set to unity in order normalize the equalized response. Unit vector $e_{\bar{\delta}+1}$ corresponds to the reduced matrix $\bar{H}^r$ for the noise channel.

Next, at step 1260, the Least Squares Metric is determined, using equation (51), for any given equalizer w.

$$PERF_{LS} = \|H^{out} w\|_2 / \|H^{in} w\|_2 \quad (51)$$

where $$H^{out} = \begin{bmatrix} H_1^{out} \\ \vdots \\ H_m^{out} \\ \bar{H}^{out} \end{bmatrix}, \text{ and } H^{in} = \begin{bmatrix} H_1^{in} \\ \vdots \\ H_m^{in} \\ \bar{H}^{in} \end{bmatrix} \quad (52a)$$

with $$H_i^{out} = \begin{bmatrix} H_i(1:\delta, :) \\ H_i(\delta+n_h+1:\text{end}, :) \end{bmatrix}, \text{ and } \bar{H}^{out} = \begin{bmatrix} \bar{H}(1:\bar{\delta}, :) \\ \bar{H}(\bar{\delta}+n_{\bar{h}}+1:\text{end}, :) \end{bmatrix}, \quad (52b)$$

and similarly, $$H_i^{in} = H_i(\delta+1:\delta+n_h, :), \text{ and } \bar{H}^{in} = \bar{H}(\bar{\delta}+1:\bar{\delta}+n_{\bar{h}}, :). \quad (52c)$$

It should be noted that the delay values $\delta$ and $\bar{\delta}$ are swept over until $PERF_{LS}$ is either minimized, or achieves an acceptably low value.

The performance of the VEQ is then analyzed, at step 1260, by evaluating one or more of the following metrics: noise whiteness, equalized (shortened) co-channel length, or SNR at the input to the joint Viterbi processor.

At step 1280, the performance of the VEQ is evaluated. If the VEQ performance is not optimal or satisfactory, at step 1240, the VEQ filter length may be increased or the relative weight $\beta$ may be varied. Satisfactory performance may be achieved, in one embodiment of the present invention, when repositioning the windows by incrementing $\delta$ and $\bar{\delta}$, and repeating the process of determining the reduced matrices $H_i^r, i=1, \ldots, m$, and $\bar{H}^r$, and computing the VEQ w. If no window position meets desired performance, the VEQ filter length $n_w$ may be increased, and, as illustrated in FIG. 12, steps 1220, 1260, and 1280 are repeated. If channels are properly shortened, but the remaining correlation in the equalized noise channel is unsatisfactory, the relative weight $\beta$ may be increased and steps 1220, 1260, and 1280 are repeated. Similarly, if channels are not shortened enough, the relative weight $\beta$ may be decreased and the design method may be re-executed.

The method described above performs joint equalization and noise whitening for joint detection of multi-user communication channels. This method produces a linear equalizer that performs the following functions: shortens the co-channels to a desired length, thus reducing the JVA computational requirements, and improves detection accuracy by whitening the additive noise. The method further reduces the effect of residual DMT tones at the input of the Viterbi by attenuating those frequencies where there is high probability of DMT error on a first pass decision, when the JVA is used as part of a cross-talk compensation method. Moreover, this VEQ design method equalizes the co-channels to the same window (in time) to improve SNR at the input and to simplify implementation of the Viterbi detection method.

It should be noted that the VEQ design is set-up in matrix form and the optimal VEQ filter is obtained by solving the least squares method (LSM). However, there are alternate computational methods that may be implemented that utilize an MMSE (Minimum Mean Square Error) formulation. In order to avoid the matrix inversions associated with matrix operations that are potentially incompatible with fixed point processing, adaptive schemes, such as LMS, based on the MMSE may also be implemented.

An alternate method for an equalizer design for the Viterbi algorithm is thus further described with reference to FIG. 14. Instead of the least squares method based on weighted channel matrices, the VEQ design is accomplished by minimizing the mean square error subject to a constraint on the length of the equalized channels. This approach can be applied to design equalizers for individual channels, or in a joint manner where a single filter shortens the impulse response of several channels simultaneously, or alternatively, in a successive manner for the different channels.

Figure 14:
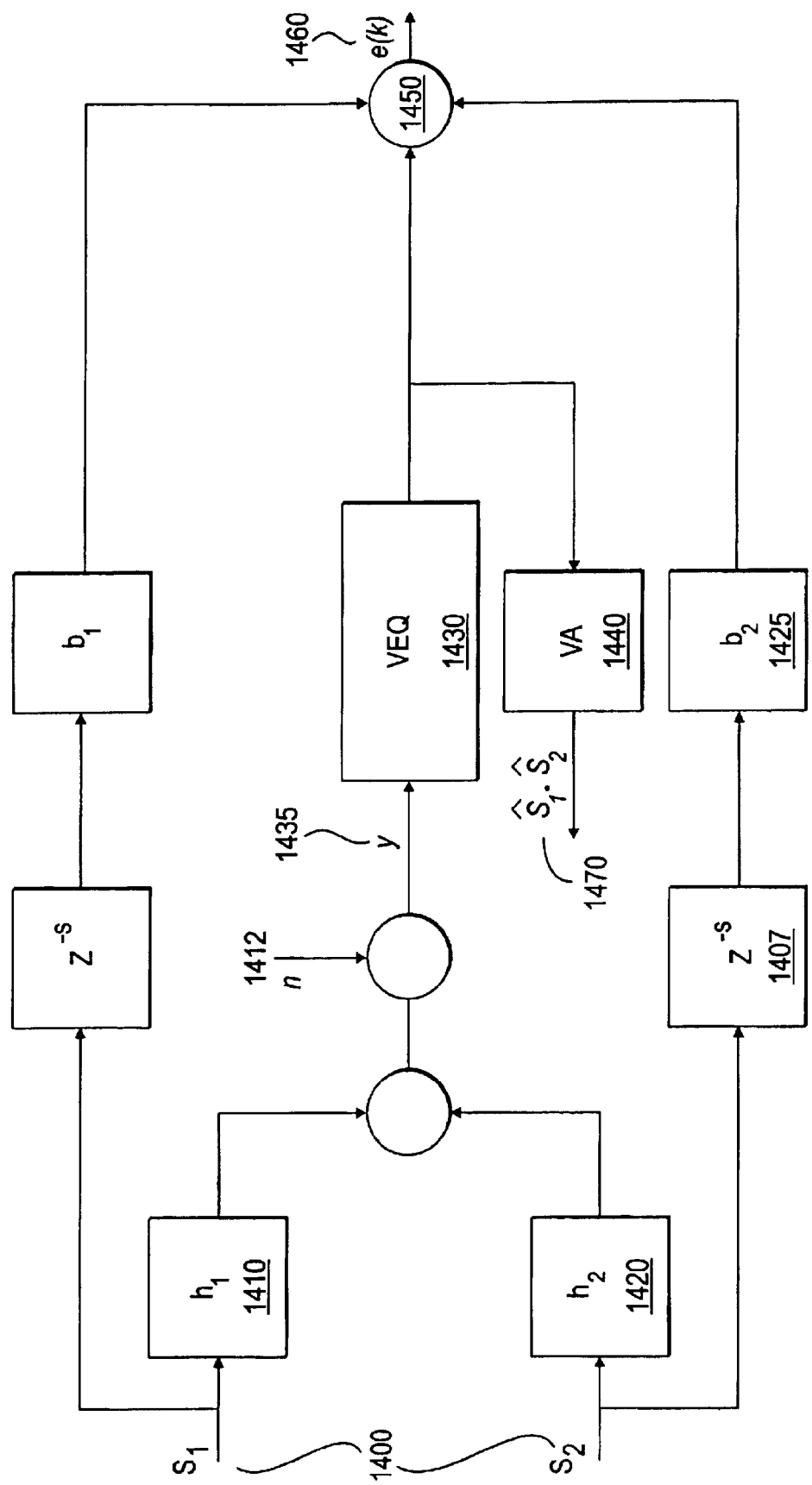
FIG. 14 illustrates a MMSE VEQ design scheme for detecting multiple disturbers, according to yet another embodiment of the present invention.

FIG. 14 illustrates a VEQ design scheme for detecting a set of symbols for multiple disturbers, in a simultaneous manner, according to one embodiment of the present invention. For each disturber $s_1$ and $s_2$, the target channel responses (or filters) $b_1$ 1415 and $b_2$ 1425 are designed in order to minimize the error in the VA 1440. The channels are equalized jointly with a single equalizer 1430. The target responses $b_1$ and $b_2$ and the VEQ parameters 1430 are designed simultaneously, such that the output of the VEQ filter is compared at block 1450 with the target responses b1 and b2. The MSE e(k) is evaluated in order to obtain a VEQ design that induces the least error in the VA 1440.

In order to find the VEQ filter parameters, the co-channel models $h_1$ 1410 and $h_2$ 1420 are determined. Signal y 1435, the input of the VEQ filter 1430, is thus formed by adding the co-channel models 1410 and 1420 with an additive gaussian noise n 1412.

The mean square error is defined as the expected value of the square of the error and it is given by equation (53):

$$MSE:\ Ee_k e_k^* \triangleq \langle e_k, e_k \rangle \tag{53}$$

Given a set of target responses $b_i$, the optimal viterbi equalizer parameter w is given by equation (54):

$$w_{opt}^* = [\tilde{b}_1^* \ldots \tilde{b}_m^*]_{opt} \begin{bmatrix} R_{s_1 y} \\ \vdots \\ R_{s_m y} \end{bmatrix} R_{yy}^{-1} \tag{54}$$

and the optimal MMSE as a function of $b_i$ is given by equation (55):

$$MMSE:\ \langle e_k, e_k \rangle = [\tilde{b}_1^* \ \tilde{b}_2^*] \begin{bmatrix} R_{s_1 s_1} - R_{s_1 y} R_{yy}^{-1} R_{y s_1} & -R_{s_1 y} R_{yy}^{-1} R_{y s_2} \\ -R_{s_2 y} R_{yy}^{-1} R_{y s_1} & R_{s_2 s_2} - R_{s_2 y} R_{yy}^{-1} R_{y s_2} \end{bmatrix} \begin{bmatrix} \tilde{b}_1 \\ \tilde{b}_2 \end{bmatrix} \tag{55}$$

where $R_{s_i y}$ are the cross-correlation matrices of signal y and disturbers $s_1$ and $s_2$, $R_{yy}$ is the auto-correlation matrix of signal y, and vectors $\tilde{b}i$ are vectors formed using filter parameters $b_1$ and $b_2$ by adding a variable sample delay.

In order to minimize the error of equation (55), the optimal solution for vectors $\tilde{b}i$ is found by determining the eigenvector $e_{min}$, corresponding to the minimum eigen-value of matrix $R_c$, where $R_c$ is given by equation (56).

$$R_c = \begin{bmatrix} R_{s_1 s_1} - R_{s_1 y} R_{yy}^{-1} R_{y s_1} & -R_{s_1 y} R_{yy}^{-1} R_{y s_2} \\ -R_{s_2 y} R_{yy}^{-1} R_{y s_1} & R_{s_2 s_2} - R_{s_2 y} R_{yy}^{-1} R_{y s_2} \end{bmatrix} \tag{56}$$

Thus, the optimal solution is given by $$\begin{bmatrix} \tilde{b}_1 \\ \tilde{b}_2 \end{bmatrix}_{opt} = e_{min}.$$

Therefore, once the target values for $b_1$ and $b_2$ filter outputs are determined by equation (56), then the VEQ w is determined using equation (54). The disturber symbols 1470 are then estimated by the VA 1440.

It should be noted that, in order to reduce the computational complexity of the compensation method, two or more co-channels may be treated as a single channel. Thus, the filters $b_1$ and $b_2$ may be treated as one filter by equalizing the two target responses $\tilde{b}_1^* = \tilde{b}_2^*$ in equation (55) and solving for the VEQ.

Figure 13:
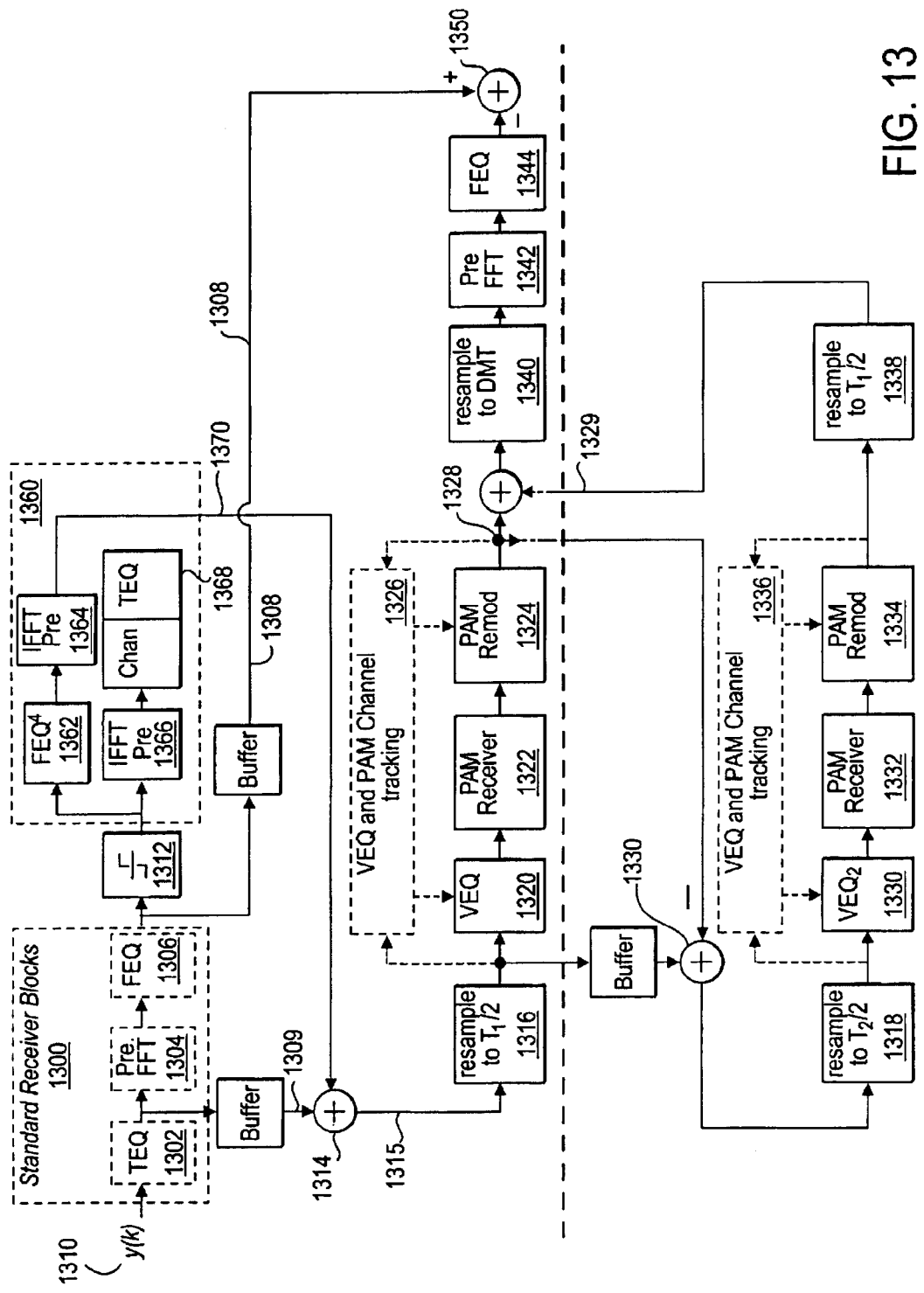
FIG. 13 illustrates a successive cancellation architecture of disturber signals of one embodiment of the present invention.

In one alternative embodiment of the present invention, each disturber is detected in a successive manner one at a time, as illustrated in FIG. 13. In such a successive scheme, it is desirable to design a VEQ that will shorten only one channel while it will suppress the interference from the other disturbers. This can be achieved with the design presented above if only one target response $b_1$ is used, while nullifying the other target response $b_2$ such that $b_2=0$.

Alternative to VEQ Design

In order to determine the estimates of the disturber symbols $s_i(n)$ of cross-talk interference, a DFE (Decision Feedback Equalizer) method may be used in place of the JVA and the VEQ design. In a DFE, the interference is canceled according to past decisions of the interference symbols. The design of the DFE includes designing two filters: the feedforward filter W and the feedback filter B. It will be appreciated that, in one embodiment of the present invention, the W and B filters are designed similarly to the VEQ filter design described above with reference to FIG. 14.

Figure 16:
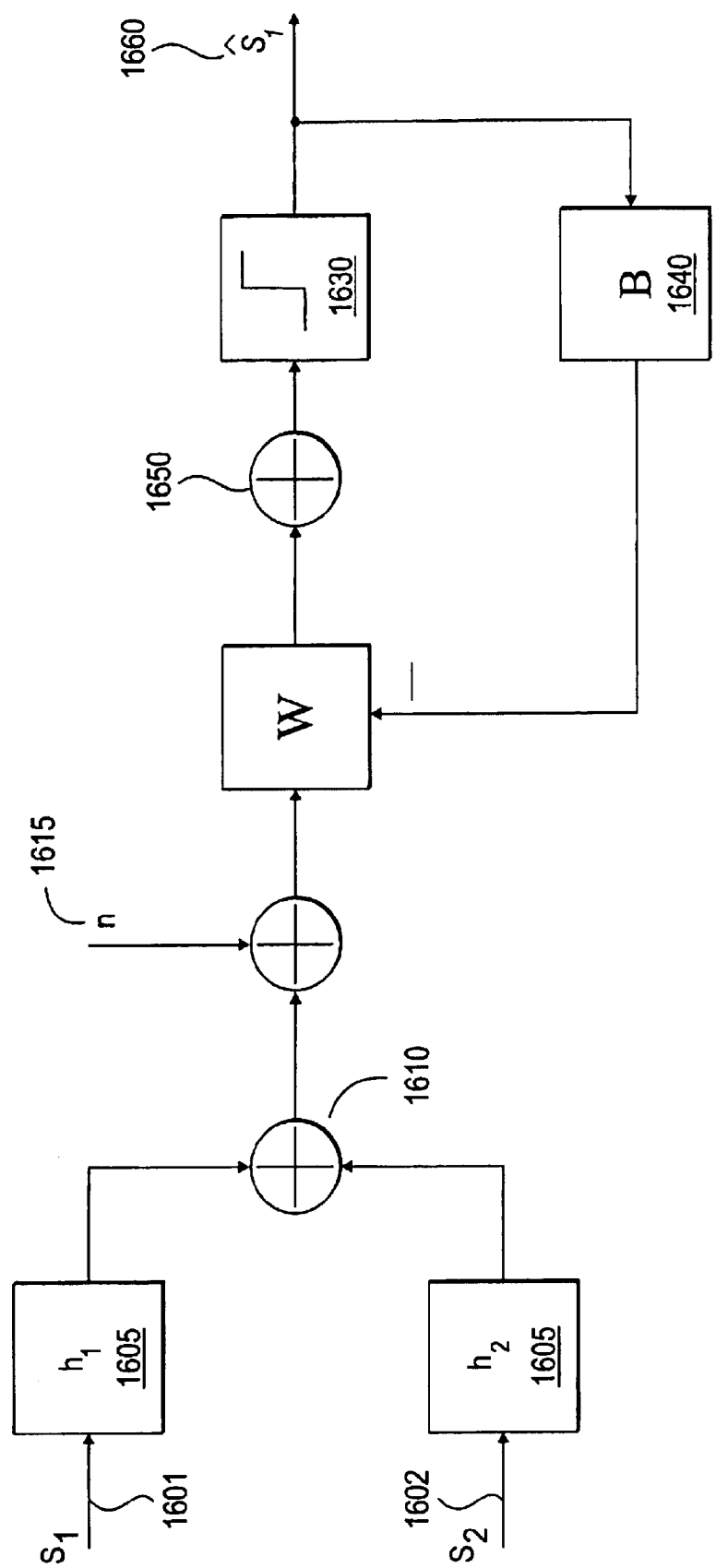
FIG. 16 illustrates a single user DFE design according to the concepts of the present invention.

FIG. 16 illustrates a single user DFE design that may be used in a successive scheme. The disturbers $s_1$ 1601 and $s_2$ 1602 are first modeled by co-channel models $h_1$ and $h_2$ 1605. The noise 1615 is then added to the summation of the two modeled disturbers 1610. The resulting signal is passed through the W filter 1620. It should be noted that the operation of a DFE is well known in the art and, in order not to obscure the present invention, specific details of the operation of the DFE are not described here. The signal is then passed through a slicer 1630. In order to obtain symbols $s_1$ 1660 of the disturber signal 1601, the output of the slicer 1630 is passed through a feedback filter 1640. The signal is then subtracted from the output of the feedforward filter 1620 and passed through the slicer 1630 in order to obtain the estimated symbols s₁ 1660.

It will be appreciated that, in one embodiment of the present invention, the W filter and the B filter may be designed in such a way that a joint DFE may detect the symbols of the summation of the two disturbers s₁ and s₂.

Figure 17:
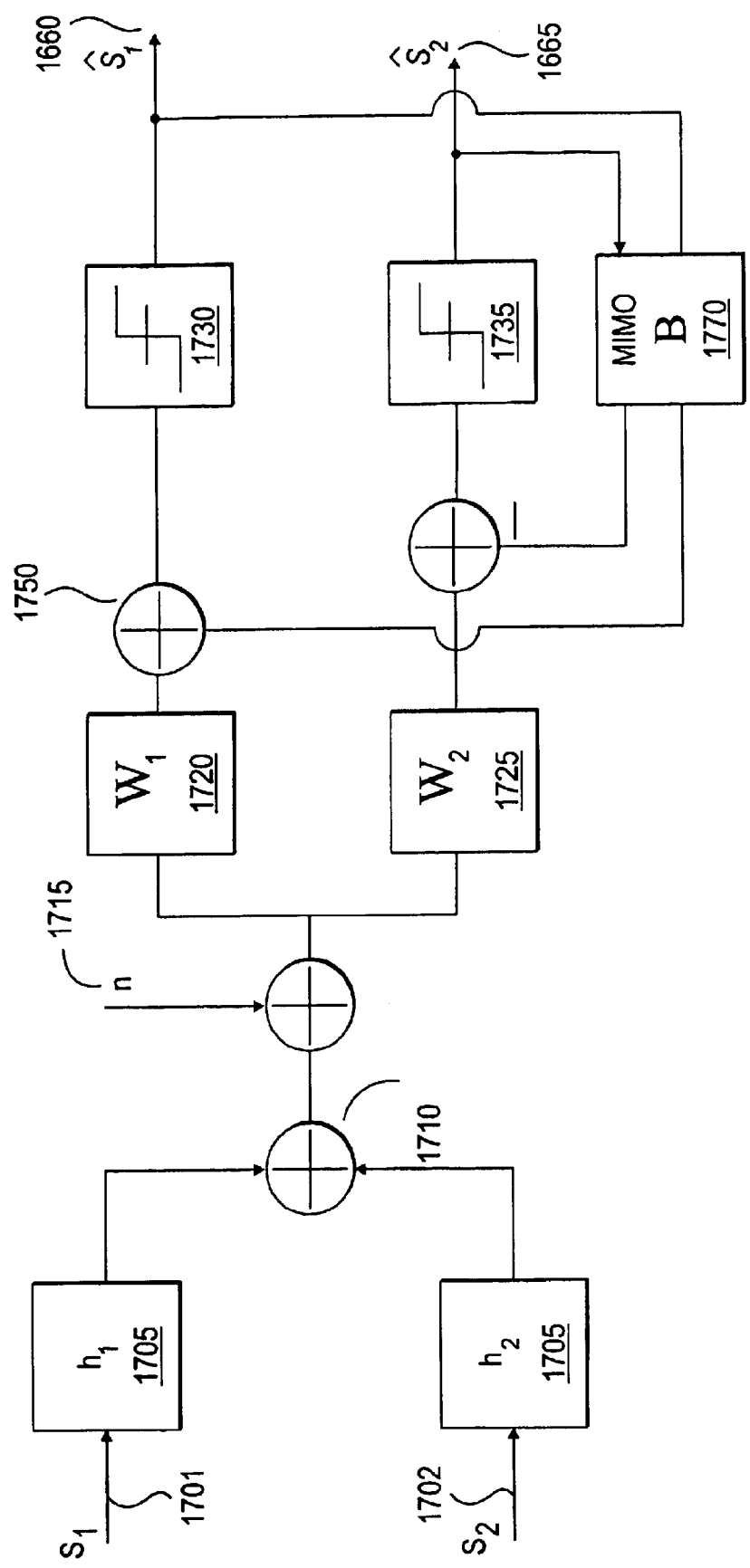
FIG. 17 illustrates a joint MIMO DFE design according to the concepts of the present invention.

FIG. 17 illustrates an alternate embodiment of the joint DFE design where multiple outputs are detected simultaneously. The sum 1710 of the two modeled disturbers s₁ 1701 and s₂ 1702 is passed through two feedforward filters W₁ 1720 and W₂ 1725 in order to attempt a first detection of the two disturbers. A multiple input multiple output (MIMO) feedback filter 1770 is designed in order to cancel the past decisions on both the s₁ symbols and s₂ symbols. Thus, at steps 1750 and 1755, the past s₁ and s₂ estimated symbols are subtracted from the output of the feedback filters, resulting in the final estimates symbols s₁ 1660 and s₂ 1665. The advantage of the MIMO DFE is that it cancels interference according to past decisions and reduces the computational complexity of the compensation method as described herein.

Robust Equalization for Systems with Uncertainty

Figure 15:
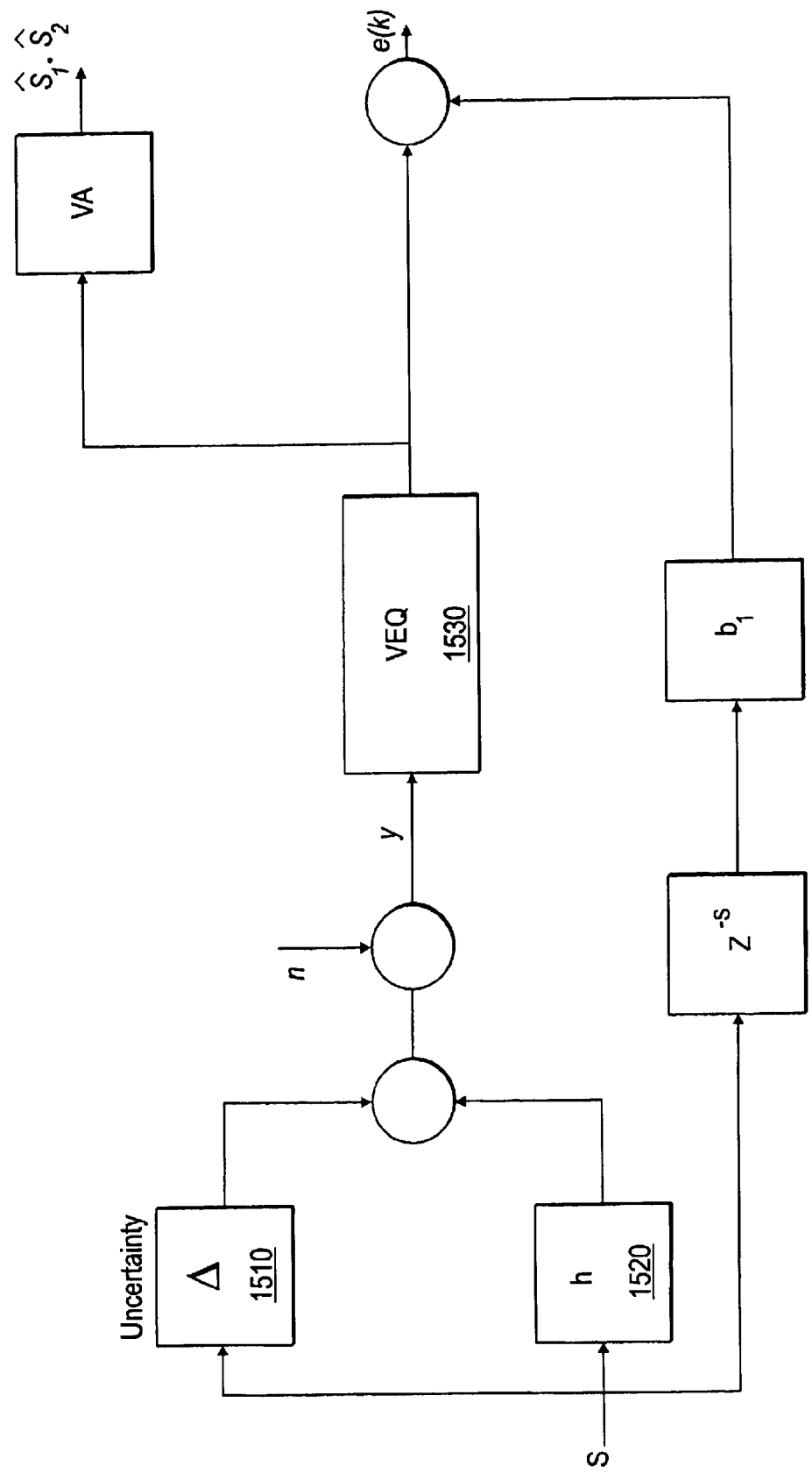
FIG. 15 illustrates another embodiment of the present invention where the compensation method is applied to a system with uncertainty.

For cases in which there is dynamic uncertainty in the channel models, the design method described above may be modified to produce an optimal "worst case" equalizer. Generally, the system model includes a nominal dynamics and uncertainty Δ, which are either additive or multiplicative. According to one embodiment of the present invention, an additive form is illustrated in FIG. 15, where the uncertainty 1510 is present in the main channel dynamics 1520. The actual channel $h_a$ 1520 can be bounded as: $\|h_a\| \leq \|h\| + \|\Delta\|$, and the uncertainty is generally normalized so that $\|\Delta\| \leq 1$.

Thus, instead of minimizing the mean square error of the estimate, the equalizer 1530 will perform the minimization subject to the bounded uncertainty. In particular, the robust optimal solution will yield a vector pair (w, b) that minimizes the MMSE: $<e_k, e_k>$ subject to $\|\Delta\| \leq 1$. It will be appreciated that the various methods described above have robust counterparts which can be solved for using linear matrix inequalities (LMIs), indefinite Riccati solvers, or μ-synthesis techniques.

Performing the compensation method described herein without accounting for uncertainty bounds may lead to compensation with poor performance or system instability. Thus, in order to ensure robustness of compensation and adaptation, uncertainty may be successively reduced at different times of the compensation method described herein. The adaptive compensation method is performed using stochastic plant models and uncertainty estimated measures acquired with dynamic identification methods. For an example of the computation of uncertainty bounds, see U.S. patent application Ser. No. 09/345,640, filed Jun. 30, 1999, entitled "Model Error Bounds for Identification of Stochastic Models for Control Design", assigned to the assignee herein, still pending.

Successive Cancellation of Disturbers

FIG. 13 illustrates an alternative embodiment of the present invention in which, instead of performing the JVA method, a successive cancellation scheme is used in order to compensate for multiple PAM disturber signals. The successive PAM cancellation method is based on the overall architecture of the compensation system described in FIG. 6. Therefore, for a set of disturbers of different rates, block 670 and block 680 of FIG. 6 are repeated for each significant disturber signal that has a distinct rate, as illustrated in FIG. 13. As such, the DMT signal is first removed from the composite signal 1310 at block 1314. The resulting signal 1315 represents the summation of all PAM disturber signals. For illustrative purposes, FIG. 13 shows the compensation of only two PAM signals with sampling rates T1 and T2, however, multiple PAM signals may be used. The signal symbols are estimated separately for the two PAM signals. Additionally, the VEQ design and implementation and the channel tracking is performed separately for the two PAM signals. Once the PAM signals are estimated, they are compensated or subtracted from the composite signal, thus resulting in a compensated DMT signal.

The composite received signal y(k) 1310 is first processed in a standard receiver block 1300. The standard receiver block includes a TEQ 1302, a Prefix/FFT block 1304, and a FEQ 1306. The operation of these blocks is described above with reference to FIG. 3, FIG. 4, FIG. 5, and FIG. 6. The signal is then passed through a slicer function 1312 in order to detect the DMT symbols. Next the signal is remodulated at block 1360 in either the frequency domain, illustrated by blocks 1366 ad 1368, or the time domain, illustrated by blocks 1362 and 1364. In the frequency domain, the operation of the standard receiver block 1300 is reversed by passing the signal through the inverse of the FEQ 1362 and performing an inverse FFT 1364. Similarly, in the time domain, the signal is remodulated using IFFT function 1366 and convolving the channels and the TEQ at block 1368.

In order to obtain a first pass estimation 1315 of the disturber signal, the resulting signal 1370 is then subtracted from the TEQ filtered signal 1309. If the PAM signal rates are not compatible with the DMT received signal, the composite disturber signal 1315 is then resampled at block 1316 at the rate $T_1/2$, for example, of the first PAM signal that will be compensated for. It should be noted that, in one embodiment of the present invention, the successive method described herein detects the high rate PAM disturber first by filtering the low rate PAM disturbers.

At block 1320, a VEQ design on the first PAM disturber signal is performed according to the VEQ design method described above. The PAM symbols are then detected at PAM receiver 1322 and remodulated at block 1324. During data transmission time the actual VEQ implementation and the PAM channel tracking is further performed at block 1326. For an example of PAM channel tracking see co-pending Patent Application Serial No. 09/710,718, filed on even date herewith, entitled, assigned to the assignee herein.

Next, the resulting estimation of the first PAM signal 1328 is subtracted at block 1330 from the composite disturber signal 1316. The resulting signal is resampled at the rate of the second PAM disturber $T_2/2$. Next, the VEQ design 1330, the estimation of the PAM symbols 1332, remodulation 1334, and tracking 1336 are performed in a similar manner as to the processing of the first PAM signal. Once the second PAM signal is estimated, it is first resampled at the rate of the first PAM disturber, at block 1338, in order to perform a summation of the disturber signals. Finally, the composite estimated disturber signal is processed further by resampling it to the DMT rate at block 1340, prefixing and performing FFT operations at block 1342, and filtering it at block 1344. At block 1350, the estimated disturber signal is subtracted from the composite received signal 1308, thus resulting in the compensated main channel symbols or DMT symbols.

System Transmission/Show Time Phase

1. DMT Removal

As stated earlier, the purpose of the DMT removal block 660 is to extract as much of the DMT component from the received signal as possible, to produce a signal $\hat{y}_{dist}$, which consists mainly of crosstalk disturbance. In one embodiment the DMT Removal block 660 requires two inputs $y_{teq}(n) \in R^{544}$, and $\hat{q}_1(k) \in C^{256}$, that are the received signal after being filtered by the TEQ 620 (in this example, a real vector of 544 points), and the FEQ 640 (in this example, a 256 vector of complex numbers), respectively.

Also as stated earlier, the first step in the DMT removal is an initial (1$^{st}$ Pass) detection on the DMT symbols, as indicated by the slicer function 662 in FIG. 6. The 1$^{st}$ pass detection produces symbols, for example in one embodiment 256 symbols, which are then conjugated and modulated back into the time domain using an IFFT (IFFT operation part of block 664). Note, however, that the IFFT results in a real vector of 512 points, 32 points less than a frame of the received vector y(n). This loss of information is due to the cyclic prefix stripping operation that occurs in the standard receiver block. After remodulation, this cyclic prefix is added back to the vector (also part of the operations shown at block 664), and the time vector is then filtered through the equalized main channel $\hat{h}_{teq}$ (also part of the operations shown at block 664). The resulting signal 666 is then subtracted from the received signal to form the 1$^{st}$ pass estimate of the disturbance signal:

$\hat{y}_{dist}(n) = y_{TEQ}(n) - \hat{y}_{DMT}(n)$, as shown in FIG. 6.

The 1st step in the DMT removal is the first pass detection on the DMT symbols, as indicated by the slicer function 662 in FIG. 6. The 1st pass detection is a maximum likelihood symbol-by-symbol slicer. It will be appreciated that the implementation of a slicer is well known to one of ordinary skill in the art and in order to avoid confusion further details of a slicer implementation are not be described herein.

After the 1st pass DMT decisions, the DMT removal module 660 remodulates the 1$^{st}$ pass DMT decisions (part of block 664), filters them through an estimate of the TEQ'd channel (part of block 664), and subtracts off the resulting estimate of the TEQ'd DMT signal 666 from the TEQ output 642.

Figure 18:
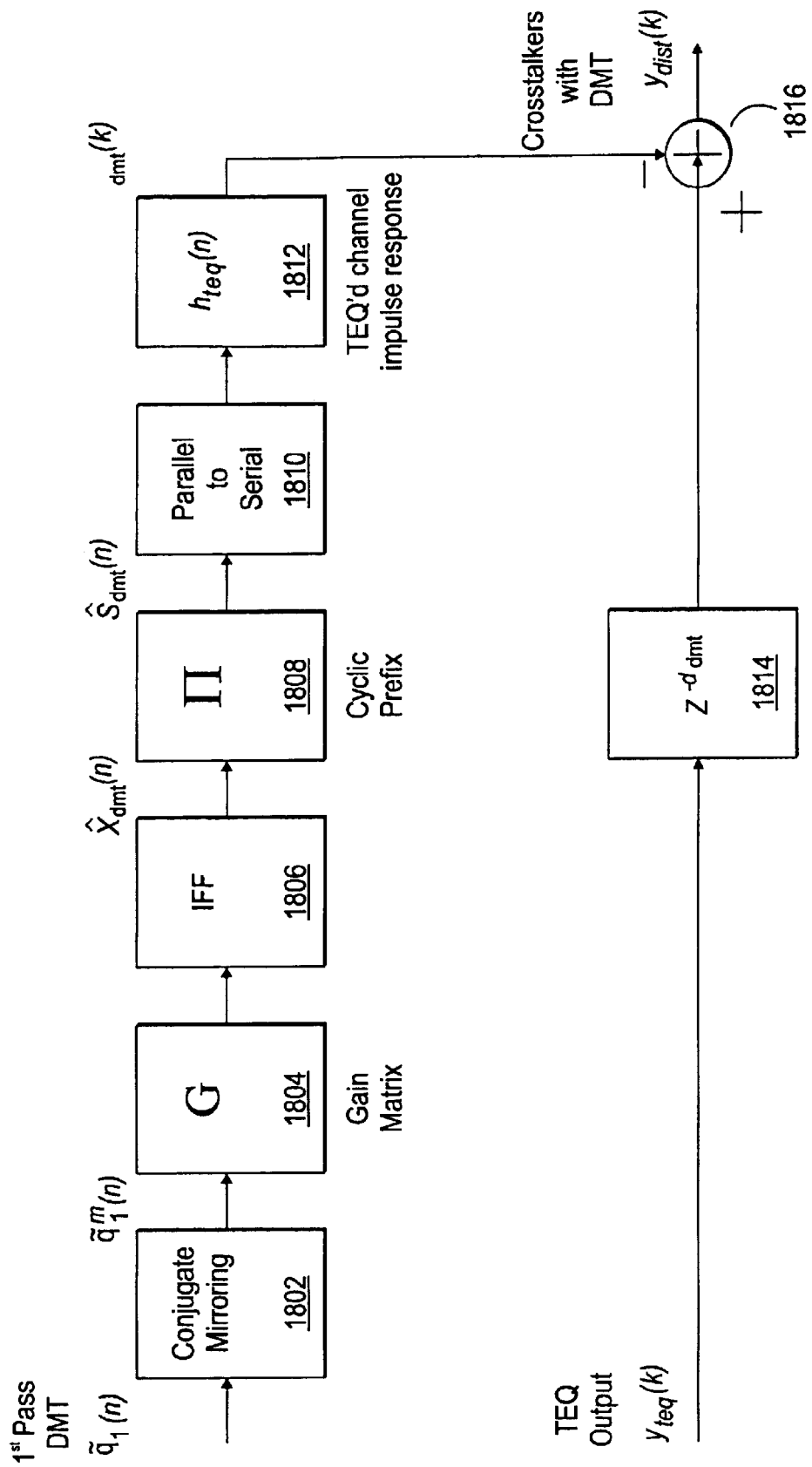
FIG. 18 illustrates a first pass DMT removal procedure according to the concepts of the present invention.

In order to further illustrate the process of DMT removal, an embodiment of a possible DMT removal subsystem is illustrated in FIG. 18. In the embodiment illustrated in FIG. 18, the first step in DMT signal removal is conjugate mirroring 1802. DSL modems using DMT use IFFTs to simultaneously modulate QAM symbols onto several sub-carriers. Since the output of the IFFT is sent directly to the DAC, then the output of the IFFT must be real-valued. This is accomplished by computing the 512-point IFFT of a complex vector of length 512 in which the upper half contains the 256 QAM symbols to be transmitted and the lower half contains conjugate mirror of these symbols about the Nyquist frequency. In the notation here, $\tilde{q}_1(n)$ shall be the vector of 1$^{st}$ pass DMT decisions and $\tilde{q}_1^m(n)$ shall be the conjugate mirrored vector of decisions (output from block 1802), according to the conjugate mirroring operation as described in a description of the DMT signal above.

After conjugate mirroring 1802 gain and re-modulation is performed on the signal (blocks 1804 and 1806 respectively). After multiplication by a diagonal gain matrix, G, 1804, the output of the IFFT (1806) is $\hat{x}_{dmt}(n) = FG\tilde{q}_1(n)$, where G and the IFFT matrix, F, are both defined as described in a description of the DMT signal above.

After re-modulation is performed a cyclic prefix operation is performed on the signal. Since Fourier transforms are defined for periodic signals, then the received DMT signal must look like a periodic signal for demodulation via an FFT to be accurate. This is accomplished in two steps. First, when the DMT signal is transmitted, it is prefixed with the last N samples of the IFFT output. This prefix is known as the cyclic prefix and in the case of DSL using DMT, N=32. Second, when the DMT signal is received it is passed through a TEQ (time-equalizer) that shortens the impulse response of the channel to 32 samples or less.

Mathematically, the cyclic prefixing step can be expressed as $\hat{s}_{dmt}(n) = \Pi \hat{x}_{dmt}(n)$ where, as in the description of the DMT signal above, $$\Pi = \begin{bmatrix} \begin{matrix} 32 \times 480 & 32 \times 32 \\ 0 & I \end{matrix} \\ \begin{matrix} 512 \times 512 \\ I \end{matrix} \end{bmatrix}.$$

This is thus the time domain estimate of the DMT signal that was transmitted. The time domain estimate is then reformatted into a serial data stream by a parallel to serial converter 1810. Next, the signal is passed though a filter, which is a model of the DMT channel 1812. This model of the DMT channel 1812 includes any transmit filters (e.g., the DAC filter), the twisted-pair line, and any receive filters (e.g., the ADC filter and the TEQ).

An initial estimate of the post-TEQ disturbance signal is then $\hat{y}_{dist}(n) = y(n - d_{dmt}) - \hat{y}_{dmt}(n)$ where y is the TEQ output, and $d_{dmt}$ is an appropriately chosen delay (1814). This delay (1814) exists because the filter $\hat{h}_{teq}(n)$ has a nearly pure delay (the TEQ cursor delay). Note that it may be possible to remove the delay (1814) without a significant loss in re-modulation accuracy provided that the TEQ cursor delay is removed from the TEQ'd channel impulse response, $\hat{h}_{teq}(n)$ 1812. Alternatively, re-modulation may be performed using the FEQ coefficients. Note that when the FEQ coefficients are used to re-modulate the DMT decisions, there is no TEQ cursor delay and hence no signal delay is introduced.

The estimate of the post-TEQ is then refined by the joint Viterbi PAM receiver, which makes use of identified PAM co-channel modules and finite PAM alphabets.

2. Disturber Symbol Detection

As discussed above, the output vector $\hat{y}_{dist}(n)$ 665 from the DMT Removal module 660 is then passed to the Disturber Symbol Detection module 670 where it is run through the VEQ 672 and Joint Viterbi Algorithm 674, resulting in a vector estimate 675 of the disturber symbols $\tilde{s}(n)$.

Following the example given earlier and referring to FIG. 6, the VEQ 672 is an FIR filter with a length, $n_w$. The output of the VEQ 672 filter is a real vector of the same length of the input sequence. The processing involved is a convolution of the 544 length input vector $\hat{y}_{dist}(n)$ 665, and the VEQ w. In one embodiment of the present invention, the length of the VEQ used is $n_w$=32 taps.

After processing in the VEQ 672 the ouput vector is processed through the Joint Viterbi Algorithm (JVA) 674. The Viterbi algorithm employs the shortened co-channels (which include the effects of the channels and the VEQ) in the computation of the Maximum Likelihood metric used to search for the optimal disturber input sequence. The design of the JVA 674 was discussed above, however, it will be appreciated that the implementation of a JVA is well known to one of ordinary skill in the art and in order to avoid confusion further details of a JVA implementation are not be described herein.

3. PAM Remodulation and Removal

Figure 19:
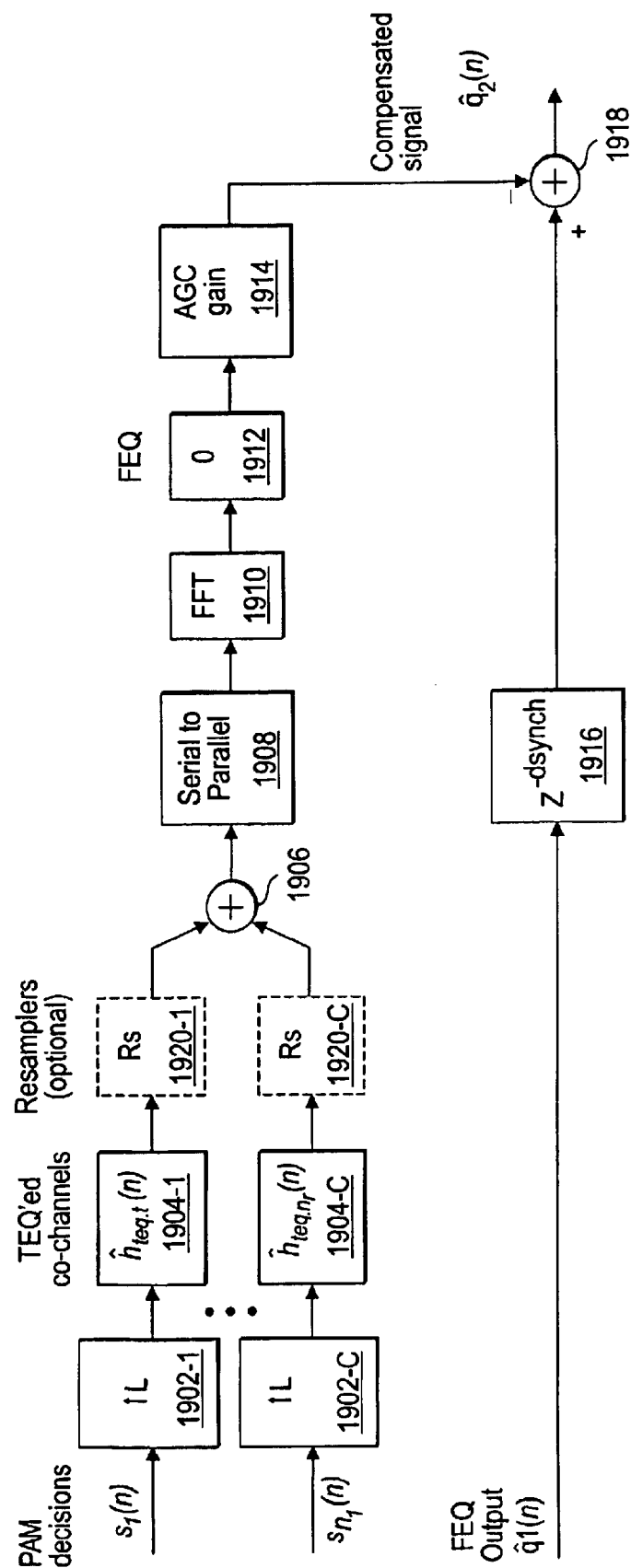
FIG. 19 illustrates an embodiment of a possible architecture of a disturber remodulation and removal module.

After the disturber symbol detection block 670 has produced a vector estimate of the disturber symbols $\tilde{s}(n)$, the estimates are routed to the PAM remodulation and removal block 680. FIG. 19 is an illustration of an embodiment of a possible architecture of a PAM remodulation and removal block, which may also be referred to as a PAM signal removal system or subsystem. Recall from the discussion above that the purpose of the PAM signal removal system, such as that shown in FIG. 19, is to produce a compensated version of the $1^{st}$ pass FEQ output using the PAM decisions produced by the disturber symbol detection block (FIG. 10, block 1040) also called the PAM receiver. This is accomplished by filtering the PAM decisions through models of the TEQ'd co-channels (including any pulse-shaping filters, A/D filters, etc.) and summing the outputs. This time domain estimate of the disturbance signal is then converted to the frequency domain by computing the FFTs of the appropriate time-windows of data. The FEQ is applied, as well as any scaling factors such as the AGC gain, and the resulting compensation vector is subtracted from the appropriately delayed $1^{st}$ pass FEQ output to produce the compensated signal. The individual components of the PAM signal removal system are discussed below.

The joint Viterbi PAM receiver (FIG. 6, block 674) produces a sequence of PAM symbols or decisions for each of the n, disturbers being compensated. The PAM co-channel models, however, oversample the PAM baud rate by a factor $P_j, j=1, \ldots, n_c$. Hence, it is necessary to upsample the PAM symbols by $P_j$, which introduces zeros between samples. For example, in illustration FIG. 19, $P_j=4 \forall j$, and thus the upsampled symbol sequences (1902-1 through 1902-C) are $$\tilde{s}_j^f = (\uparrow 4) \tilde{s}_j$$

For the co-channel model filter (1904-1 through 1904-C) an estimate of the component of the post-TEQ disturbance signal due to the compensated disturbers is obtained by filtering the upsampled PAM symbol sequences (from blocks 1902-1 through 1902-C) through complete impulse response models of the PAM co-channels, $\hat{h}_{teq,j}$. Hence, the estimate of the post-TEQ disturbance signal (output from 1906) is $$\hat{y}_{pam}(n) = \sum_{j=1}^{n_C} \sum_{k=-\infty}^{\infty} \tilde{s}_j^f(k) \hat{h}_{teq,j}(n-k)$$

$$= \sum_{j=1}^{n_C} \sum_{k=-\infty}^{\infty} \tilde{s}_j(k) \hat{h}_{teq,j}(n-P_j k).$$

The complete impulse response model of the PAM co-channel may be obtained during the identification. For an example of identification, see co-pending patent application Ser. No. 09/710,718, titled "Method and Apparatus for Characterization of Disturbers in Communication Systems", filed on even date herewith and assigned to the assignee herein.

In this embodiment, resamplers Rs (1920-1 through 1920-C) may need to operate on the remodulated signal to convert its data rate to the DMT sampling rate. It should also be noted that all of the above filters may be implemented as FIR filters.

The conversion of the disturber estimate to the frequency domain 1910 is accomplished using the same 512-point FFT that is used to demodulate the DMT signal. The same FEQ processing that is applied to the received DMT signal (FIG. 6, block 640) is applied to the frequency domain representation of the disturber estimate 1912. The FEQ is implemented as 256 complex scalar multiplies.

Next the signal is adjusted for AGC gain 1914, and then, provided the signals have been aligned in time 1916 appropriately as discussed above, the compensated DMT signal (from 1918) with the PAM removed is $$\hat{q}_2(n) = \hat{q}_1(n) - c(n)$$

where $\hat{q}_1(n)$ is the original FEQ output.

At this point the compensated DMT signal $\hat{q}_2(n)$, which is in the frequency domain, requires minimal further processing to detect the transmitted symbols and this detection may be performed by a slicer as described above.

4. Showtime Adaptation and Tracking

During showtime the compensation system will enter an adaptive mode which further refines (or updates) co-channel models ($\hat{h}_1$, $\hat{h}_2$), the VEQ, and the shortened channels ($b_1$, $b_2$). Adaptation may be desirable when the communications system has changed either because of small changes, for example time drifts and/or thermal/environmental changes, or because of sudden changes, for example a new service turns on or a service turns off. Thus because of these changes it may be desirable to recompute the coefficients of compensation.

For the purposes herein, there are two main types of adaptation: direct adaptation and indirect adaptation. In the present invention direct adaptation is used when there is no explicit tracking of the channels and the design of the compensator does not need to be changed. In other words, only the parameters of the design need to be changed or updated. Thus, in the present invention, direct adaptation adjusts the coefficients of the VEQ and JVA without doing explicit identification or design calculations at showtime. Indirect adaptation is used in the present invention when the channels change such that the design of the compensator needs to be changed. In other words, the parameters of the communication system changed and the design of the compensator must be changed or updated. Thus, in the present invention, indirect adaptation adjusts the coefficients of the VEQ and JVA by performing identification and design calculations that were previously performed during design time. The extensive computations required for this are executed at a slower rate in real-time.

Figures 20, 21:
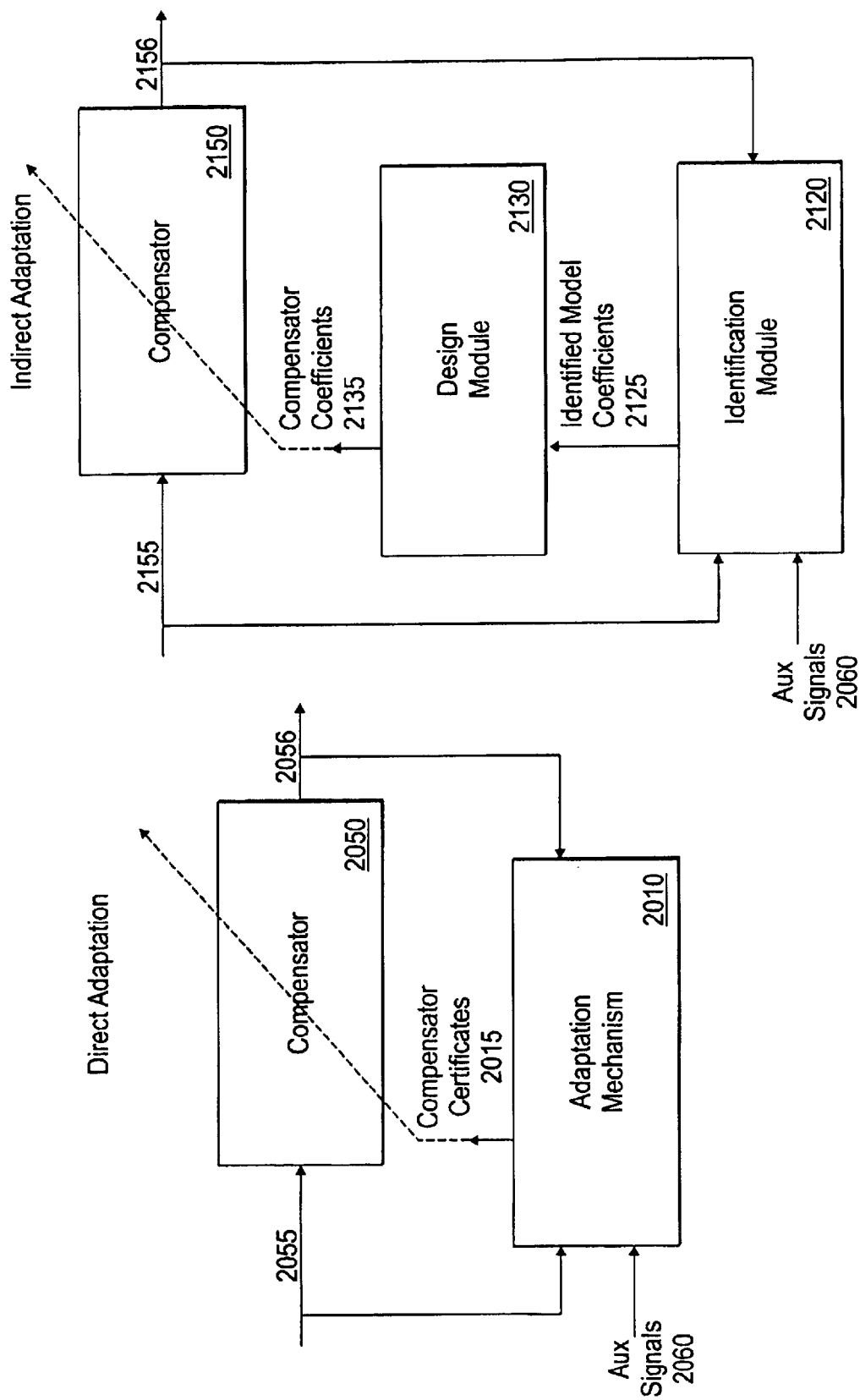
FIG. 20 illustrates a block diagram of a direct adaptation method according to the concepts of the present invention.
FIG. 21 illustrates a block diagram of a indirect adaptation method according to the concepts of the present invention.

FIG. 20 illustrates a generic block diagram for direct adaptation as applied to the present invention. An adaptation mechanism 2010 takes the input 2055 and output 2056 and some auxiliary signals 2060 and computes and updates the compensator coefficients 2015 and applies those coefficients to the compensator 2050. An example of one embodiment of a direct adaptation mechanism is described in detail below.

FIG. 21 illustrates a generic block diagram for indirect adaptation as applied to the present invention. An identification module 2120 takes the input 2155 and output 2156 and some auxiliary signals 2160 and performs an identification process to produce identified model coefficients 2125. Design module 2130 takes the identified model coefficients 2125 and redesigns the compensator coefficients 2135, effectively redesigning the compensator 2150. It should be noted that indirect adaptation is better equipped for the incorporation of uncertainty because the indirect adaptation mechanism includes an identification process.

Direct Adaptation Example

Figure 22:
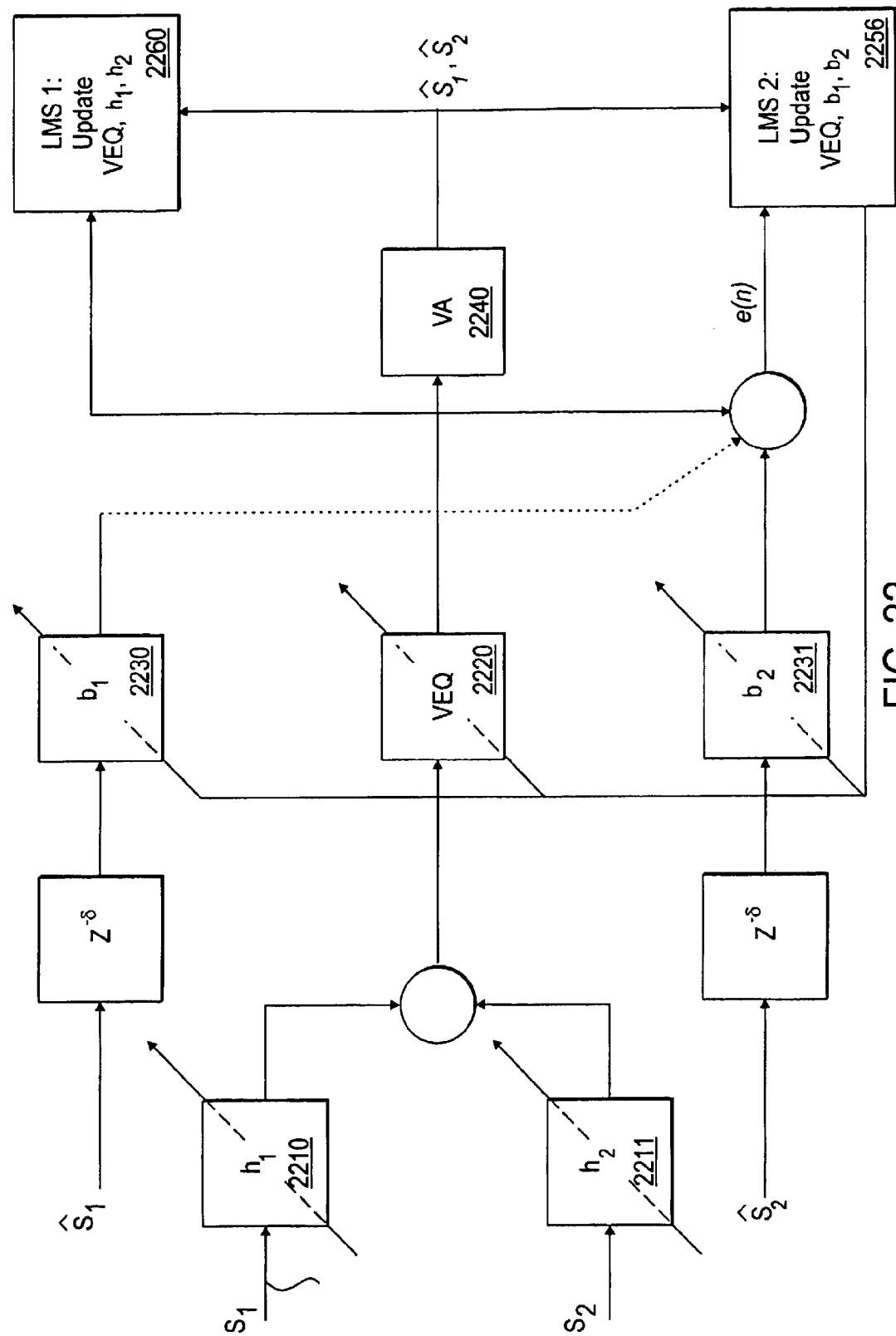
FIG. 22 illustrates an exemplary embodiment of a direct adaptation mechanism according to the concepts of the present invention.

FIG. 22 illustrates an exemplary embodiment of a direct adaptation mechanism in the context of the present invention. It should be noted that this example of an adaptation mechanism is merely exemplary and the present invention should not be limited thereto.

In the embodiment illustrated in FIG. 22, one or more of the co-channel models ($\hat{h}_1$, $\hat{h}_2$) 2210 and 2211, the VEQ 2220, and/or the shortened channels ($b_1$, $b_2$) 2230 and 2231 are refined (or updated) by using two ongoing least-means-squares (LMS) processes 2250 and 2260. In the embodiment of FIG. 22 two distinct LMS routines are envisioned, LMS 2260 for the explicit co-channel models ($\hat{h}_1$, $\hat{h}_2$) for the PAM remodulation, and LMS 2250 for the shortened channels ($b_1$, $b_2$) that are required for the Viterbi Algorithm (VA).

In the formulation for the VEQ LMS 2250 the desired objective (cost function) is the expected value of the squared error signal $$<e,e>=Ee(n)^2.$$

The error signal is defined as $$e(n) = f^T y(n) - \sum_{i=1}^{m} b_i^T s_i(\delta) = [\,f^T \quad b_1^T \quad \ldots \quad b_m^T\,] \begin{bmatrix} y(n) \\ s_1 \\ \vdots \\ s_m \end{bmatrix} \triangleq g^T u(n)$$

where $f^T \in R^{n_f}$ is the VEQ filter, $b_i \in R^{L_{bi}}$ are the co-channels vectors, $s_i$ are the disturber symbols sent (generally complex), and $\delta$ is a relative delay between the shortened channel and the filter path that is used as an optimization degree of freedom.

Normalizing the first tap in order to avoid a trivial solution for the optimal g, it can be shown that the error can be expressed as $$e(n) = \tilde{g}^T \tilde{u}(n) - s_1(n-\delta),$$

where $\tilde{g}$, $\tilde{u}(n)$ contain vectors $b_1$, $s_1$ vectors shortened by one element each. For real-time implementation $s_i$ are replaced by detected symbols $\hat{s}_i$. In an LMS setting, the gradient of the mean square objective is approximated with the derivative of the instantaneous square of the error (ie, not the averaged value given above . . . ). That is $$J(n) = |e(n)|^2,$$

and the gradient is taken to be $$\nabla J(n) = \frac{\partial |e(n)|^2}{\partial \tilde{g}^T} = 2\tilde{u}\tilde{u}^T g - \tilde{u} s_1(n-\delta).$$

It can be shown using algebraic steps that the gradient simplifies to $$\nabla J(n) = 2\tilde{u}e(n).$$

Thus the update formula for the VEQ based on the LMS becomes:

$$\tilde{g}(n+1) = \tilde{g}(n) - 2\mu\tilde{u}e(n)$$

5. Performance Monitoring

During showtime it may be desirable to monitor the performance of the compensator that was designed so that if the performance drops below a desired level the compensation system may be modified using any of the following techniques: adaptation, retraining, and/or soft reconfiguration.

In one embodiment of the present invention performance monitoring is performed by tracking the errors of the compensated signal. If the errors become large then the compensation system may need to be modified.

In another embodiment of the present invention the errors of the compensated signal are collected and white noise tests are performed on the collected error signals. If the noise of the system is not white (i.e., is "colored"), then there is a disturber (or disturbers) that have not been identified. For examples of white noise tests see patent application, Ser. No. 09/523,065, titled "Method for Automated System Identification of Linear Systems," filed on Mar. 10, 2000, and assigned to the assignee herein.

In yet another embodiment of the present invention performance monitoring is performed by monitoring the SNR on the main channel in real time. If there are significant changes in the SNR, for example significant changes in the SNR between the first pass of the DMT receiver and the second pass of the DMT receiver, may indicate the compensation design is no longer optimal. Thus, it may be advantageous to re-perform the bit loading calculations of design time because the bit loading structure previously calculated is no longer optimal for the new SNR picture.

6. Retraining

The compensation mechanism of the present invention enters what is referred to as "retraining" when new disturbers appear after the initial training process has occurred. For example, in the DSL system example given above, the compensation system goes through a fast retrain when new services get turned on that interfere with or impair the channels being compensated. For an example of retraining, see co-pending patent application, Ser. No. 09/710,579, titled "Method and Apparatus for Cooperative Diagnosis of Impairments and Mitigation of Disturbers in Communication Systems", filed on even date herewith, and assigned to the assignee herein.

7. Soft Reconfiguration

The compute resources available at show time and initialization time are very different compared to a design environment. In the design environment design automation merely assists the designer. The same is not true at show time and initialization time. Real-time design procedures require total automation and very high reliability. To achieve the reliability, the design method can explicitly reflect compute resource costs and constraints in the cost metrics in a real-time planner. Thus, it may be advantageous to have automated design mechanisms (or tools) to perform reconfigurations, for example reconfiguration of the Viterbi algorithm of the present invention during show time, that optimize the design based upon fixed compute costs. For examples of some such reconfiguration tools and methods, see U.S. Pat. No. 5,880,959, titled "Method for Computer-Aided Design of a Product or Process," issued on Mar. 9, 1999, and assigned to the assignee herein; patent application Ser. No. 09/345,172, titled "Real-Time Planner for Design," filed Jun. 30, 1999, and assigned to the assignee herein, still pending; patent application Ser. No. 09/345,166, titled "Adaptation to Unmeasured Variables," filed Jun. 30, 1999, and assigned to the assignee herein, still pending; and patent application Ser. No. 09/345,640, titled "Model Error Bounds for Identification of Stochastic Models for Control Design," filed Jun. 30, 1999, and assigned to the assignee herein, still pending.

8. Fixed Point Implementation

In some embodiments of the present invention it may be desirable and/or necessary to design a tight footprint implementation. For example, in the DSL system example given above, if the compute resources and/or hardware resources are limited on the transceiver it may be necessary to decrease the compute costs and/or footprint of the compensation software and architecture in an automated design procedure. One way to reduce the footprint and/or compute cost of the present invention is to implement the compensator in a fixed point implementation. For an example of a method and apparatus for fixed point implementation see co-pending patent application Ser. No. 09/710,410, titled "Method and System for Design and Implementation of Fixed-Point Filters for Control and Signal Processing," filed on even date herewith, and assigned to the assignee herein.

Thus, a method and system for compensating for crosstalk interference in communication systems have been described. Although specific embodiments have been described, various modifications to the disclosed embodiments will be apparent to one of ordinary skill in the art upon reading this disclosure. Therefore, it is to be understood that the specification and drawings are merely illustrative of and not restrictive on the broad invention and that this invention is not limited to the specific embodiments shown and described.

What is claimed is:

1. A method for reducing interference in a communication system, the method comprising:
   receiving a composite signal comprised of a main signal and at least one interfering signal;
   performing a training operation comprising a frequency domain training and a time domain training operation;
   performing a channel model identification comprising identifying the main signal and identifying the at least one interfering signal;
   designing a compensation system to obtain an estimation of the at least one interfering signal;
   performing a compensation operation of the at least one interfering signals using the compensation system; and
   performing a final detection and adaptation of the main signal.

2. The method according to claim 1, wherein designing a compensation system comprises:
   estimating a compensated signal-to-noise ratio of each of the at least one interfering signal; and
   estimating a corresponding compensated bit loading.

3. The method according to claim 2, wherein designing a compensation system further comprises:
   selecting a set of interfering signals according to the estimated, compensated signal-to-noise ration of each of the at least one interfering signal.

4. The method according to claim 3, wherein designing a compensation system further comprises:
   determining a gain corresponding to the estimated bit loading of each signal of the set of interfering signals.

5. The method according to claim 1, wherein estimating the at least one interfering signal is performed using a maximum likelihood sequence estimator.

6. The method according to claim 1, wherein designing a compensation system further comprises approximating a signal constellation aggregated set corresponding to the at least one interfering signal.

7. The method according to claim 6, wherein approximating the signal constellation aggregated set comprises determining a set of optimal cluster centers.

8. The method according to claim 7, wherein determining the set of optimal cluster centers comprises calculating a set of centroids.

9. The method according to claim 1, wherein designing a compensation system further comprises:
   designing a equalizer in order to pre-filter the at least one interfering signal.

10. The method according to claim 9, wherein the equalizer is a viterbi equalizer.

11. The method according to claim 9, wherein designing the equalizer comprises:
    selecting a number of design parameters;
    forming a set of convolution matrices of the at least one interfering signal;
    forming a set of reduced matrices from the set of convolution matrices for a given delay window of the at least one interfering signal;
    determining an equalizer parameter; and
    determining a Least Square Metric for the equalizer parameter.

12. The method according to claim 11, wherein selecting a number of design parameters comprises selecting a desired channel length of the at least one interfering signal.

13. The method according to claim 11, wherein selecting a number of design parameters comprises selecting an equalizer filter length.

14. The method according to claim 11, wherein selecting a number of design parameters comprises selecting a bit error rate for the at least one interfering signal.

15. The method according to claim 11, wherein selecting a number of design parameters comprises selecting a relative weight factor in order to control the channel length.

16. The method according to claim 11, wherein designing the equalizer further comprises evaluating the Least Square Metric of the equalizer.

17. The method according to claim 11, wherein determining the equalizer parameter is performed using a joint least square method.

18. The method according to claim 11, wherein determining the equalizer parameter is performed using a singular value decomposition method.

19. The method according to claim 1, wherein designing a compensation system to obtain an estimation of the at least one interfering signal comprises processing the at least one interfering signal using a joint viterbi process.

20. A computer readable medium containing executable instructions which, when executed in a processing system, cause said system to perform a method comprising:
    receiving a composite signal comprised of a main signal and at least one interfering signal;
    performing a training operation comprising a frequency domain training and a time domain training operation;
    performing a channel model identification comprising identifying the main signal and identifying the at least one interfering signal;
    designing a compensation system to obtain an estimation of the at least one interfering signal;
    performing a compensation operation of the at least one interfering signals using the compensation system; and
    performing a final detection and adaptation of the main signal.

21. The computer readable medium according to claim 20, wherein designing a compensation system comprises:
    estimating a compensated signal-to-noise ratio of each of the at least one interfering signal; and
    estimating a corresponding compensated bit loading.

22. The computer readable medium according to claim 21, wherein designing a compensation system further comprises:
    selecting a set of interfering signals according to the estimated, compensated signal-to-noise ration of each of the at least one interfering signal.

23. The computer readable medium according to claim 22, wherein designing a compensation system further comprises:
    determining a gain corresponding to the estimated bit loading of each signal of the set of interfering signals.

24. The computer readable medium according to claim 20, wherein estimating the at least one interfering signal is performed using a maximum likelihood sequence estimator.

25. The computer readable medium according to claim 20, wherein designing a compensation system further comprises approximating a signal constellation aggregated set corresponding to the at least one interfering signal.

26. The computer readable medium according to claim 25, wherein approximating the signal constellation aggregated set comprises determining a set of optimal cluster centers.

27. The computer readable medium according to claim 26, wherein determining the set of optimal cluster centers comprises calculating a set of centroids.

28. The computer readable medium according to claim 20, wherein designing a compensation system further comprises:
  designing a equalizer in order to pre-filter the at least one interfering signal.

29. The computer readable medium according to claim 28, wherein the equalizer is a viterbi equalizer.

30. The computer readable medium according to claim 28, wherein designing the equalizer comprises:
  selecting a number of design parameters;
  forming a set of convolution matrices of the at least one interfering signal;
  forming a set of reduced matrices from the set of convolution matrices for a given delay window of the at least one interfering signal;
  determining an equalizer parameter; and
  determining a Least Square Metric for the equalizer parameter.

31. The computer readable medium according to claim 30, wherein selecting a number of design parameters comprises selecting a desired channel length of the at least one interfering signal.

32. The computer readable medium according to claim 30, wherein selecting a number of design parameters comprises selecting an equalizer filter length.

33. The computer readable medium according to claim 30, wherein selecting a number of design parameters comprises selecting a bit error rate for the at least one interfering signal.

34. The computer readable medium according to claim 30, wherein selecting a number of design parameters comprises selecting a relative weight factor in order to control the channel length.

35. The computer readable medium according to claim 30, wherein designing the equalizer further comprises evaluating the Least Square Metric of the equalizer.

36. The computer readable medium according to claim 30, wherein determining the equalizer parameter is performed using a joint least square method.

37. The computer readable medium according to claim 30, wherein determining the equalizer parameter is performed using a singular value decomposition method.

38. The computer readable medium according to claim 20, wherein designing a compensation system to obtain an estimation of the at least one interfering signal comprises processing the at least one interfering signal using a joint viterbi process.

39. An article of manufacture comprising a program storage medium readable by a computer and tangibly embodying at least one program of instructions executable by the computer to perform a method comprising:
  receiving a composite signal comprised of a main signal and at least one interfering signal;
  performing a training operation comprising a frequency domain training and a time domain training operation;
  performing a channel model identification comprising identifying the main signal and identifying the at least one interfering signal;
  designing a compensation system to obtain an estimation of the at least one interfering signal;
  performing a compensation operation of the at least one interfering signals using the compensation system; and
  performing a final detection and adaptation of the main signal.

40. The article of manufacture according to claim 39, wherein designing a compensation system comprises:
  estimating a compensated signal-to-noise ratio of each of the at least one interfering signal; and
  estimating a corresponding compensated bit loading.

41. The article of manufacture according to claim 40, wherein designing a compensation system further comprises:
  selecting a set of interfering signals according to the estimated, compensated signal-to-noise ration of each of the at least one interfering signal.

42. The article of manufacture according to claim 41, wherein designing a compensation system further comprises:
  determining a gain corresponding to the estimated bit loading of each signal of the set of interfering signals.

43. The article of manufacture according to claim 39, wherein estimating the at least one interfering signal is performed using a maximum likelihood sequence estimator.

44. The article of manufacture according to claim 39, wherein designing a compensation system further comprises approximating a signal constellation aggregated set corresponding to the at least one interfering signal.

45. The article of manufacture according to claim 44, wherein approximating the signal constellation aggregated set comprises determining a set of optimal cluster centers.

46. The article of manufacture according to claim 45, wherein determining the set of optimal cluster centers comprises calculating a set of centroids.

47. The article of manufacture according to claim 39, wherein designing a compensation system further comprises:
  designing a equalizer in order to pre-filter the at least one interfering signal.

48. The article of manufacture according to claim 47, wherein the equalizer is a viterbi equalizer.

49. The article of manufacture according to claim 47, wherein designing the equalizer comprises:
  selecting a number of design parameters;
  forming a set of convolution matrices of the at least one interfering signal;
  forming a set of reduced matrices from the set of convolution matrices for a given delay window of the at least one interfering signal;
  determining an equalizer parameter; and
  determining a Least Square Metric for the equalizer parameter.

50. The article of manufacture according to claim 49, wherein selecting a number of design parameters comprises selecting a desired channel length of the at least one interfering signal.

51. The article of manufacture according to claim 49, wherein selecting a number of design parameters comprises selecting an equalizer filter length.

52. The article of manufacture according to claim 49, wherein selecting a number of design parameters comprises selecting a bit error rate for the at least one interfering signal.

53. The article of manufacture according to claim 49, wherein selecting a number of design parameters comprises selecting a relative weight factor in order to control the channel length.

54. The article of manufacture according to claim 49, wherein designing the equalizer further comprises evaluating the Least Square Metric of the equalizer.

55. The article of manufacture according to claim 49, wherein designing a compensation system to obtain an estimation of the at least one interfering signal comprises processing the at least one interfering signal using a joint viterbi process.

56. The article of manufacture according to claim 49, wherein determining the equalizer parameter is performed using a joint least square method.

57. The article of manufacture according to claim 49, wherein determining the equalizer parameter is performed using a singular value decomposition method.

58. A compensation method comprising:
receiving a composite signal comprised of a main signal and at least one interfering signal;
designing a equalizer in order to pre-filter the at least one interfering signal, wherein designing the equalizer comprises:
selecting a number of design parameters;
forming a set of convolution matrices of the at least one interfering signal;
forming a set of reduced matrices from the set of convolution matrices for a given delay window of the at least one interfering signal;
determining an equalizer parameter; and
determining a Least Square Metric for the equalizer parameter.

59. The method according to claim 58, wherein the equalizer is a viterbi equalizer.

60. The method according to claim 58, wherein selecting a number of design parameters comprises selecting a desired channel length of the at least one interfering signal.

61. The method according to claim 58, wherein selecting a number of design parameters comprises selecting an equalizer filter length.

62. The method according to claim 58, wherein selecting a number of design parameters comprises selecting a bit error rate for the at least one interfering signal.

63. The method according to claim 58, wherein selecting a number of design parameters comprises selecting a relative weight factor in order to control the channel length.

64. The method according to claim 58, wherein designing the equalizer further comprises evaluating the Least Square Metric of the equalizer.

65. The method according to claim 58, wherein designing a compensation system to obtain an estimation of the at least one interfering signal comprises processing the at least one interfering signal using a joint viterbi process.

66. The method according to claim 58, wherein determining the equalizer parameter is performed using a joint least square method.

67. The method according to claim 58, wherein determining the equalizer parameter is performed using a singular value decomposition method.

68. A compensation system comprising:
a receiver for receiving a composite signal comprising a main signal and at least one interfering signals;
a removal module for removing the main signal form the composite signal;
a detection module for estimating the at least one interfering signal, wherein the detection module comprises an equalizer to pre-filter the at least one interfering signal; and
a second removal module for removing the at least one estimated interfering signal from the composite signal.

69. The compensating system according to claim 68, wherein the equalizer is a viterbi equalizer.

70. The compensating system according to claim 68, wherein the second removal module comprises a remodulator for remodulating the at least one estimated interfering signal.

71. The compensating system according to claim 68, wherein the receiver comprises:
a time domain equalizer; and
a frequency domain equalizer.

72. A system comprising:
a receiver module for processing a received signal;
an identification module for identifying and estimating the received signal;
a bit loading module; and
a compensator module for estimating and compensating for at least one disturber of the received signal.

* * * * *

UNITED STATES PATENT AND TRADEMARK OFFICE
CERTIFICATE OF CORRECTION

| | |
|---|---|
| PATENT NO. | : 6,834,109 B1 |
| APPLICATION NO. | : 09/710610 |
| DATED | : December 21, 2004 |
| INVENTOR(S) | : Thomas E. Pare, Jr. et al. |

It is certified that error appears in the above-identified patent and that said Letters Patent is hereby corrected as shown below:

DRAWINGS, FIG. 8, Box 830 should read -- Is $S_r$ larger than a selected lower bound? --.

Page 2, OTHER PUBLICATIONS, Col. 2, line 53 reads "Craig Michael Teuscher, Dissertation submitted as requirement for the degree of Dr. of Philosophy in Engineering – Electrical Engineering and Computer Sciences, Low Power Receiver design for Portalbe RF Applications: Design and Implementation of an Adaptive Multiuser Detector for an Indoor, Wideband CDMA Application, Fall 1998, pp 37, 43-52." and should read -- Craig Michael Teuscher, Dissertation submitted as requirement for the degree of Dr. of Philosophy in Engineering – Electrical Engineering and Computer Sciences, Low Power Receiver design for Portable RF Applications: Design and Implementation of an Adaptive Multiuser Detector for an Indoor, Wideband CDMA Application, Fall 1998, pp 37, 43-52. --.

Column 1, lines 20-21 read should read -- … SATION FOR INTERNAL CABLE BINDER IMPAIRMENTS", application Ser. No…. --. (no new paragraph)

Column 1, line 45 should read -- …DSL systems, a data signal running along a telephone wire… --.

Column 2, line 1 should read -- …presence of competing providers in the same physical line… --.

UNITED STATES PATENT AND TRADEMARK OFFICE
CERTIFICATE OF CORRECTION

PATENT NO. : 6,834,109 B1
APPLICATION NO. : 09/710610
DATED : December 21, 2004
INVENTOR(S) : Thomas E. Pare, Jr. et al.

It is certified that error appears in the above-identified patent and that said Letters Patent is hereby corrected as shown below:

Column 6, line 24 should read -- ...such as cross-talk, AM radio, power ingress noise, thermal... --.

Column 8, lines 56-57 should read -- ...and not limiting of the present invention. As such, other configurations may be used and other systems exhibiting... --.

Column 8, line 59 reads should read -- ...from the use of the present invention. --.

Column 9, Equation 7 reads " $y_{dmt}(t) = \Sigma_{k=-\infty}^{\infty} s(k)h(t-kT_{dmt})$ " and should read -- $y_{dmt}(t) = \Sigma_{k=-\infty}^{\infty} s(k)h(t-kT_{dmt})$ --.

Column 9, line 62 should read -- ... invention, $T_{dmt}=1/(2.208\times10^6)$ sec. Finally, the received con-... --.

Column 9, line 64 should read -- ... converter at block 540, resulting in the signal $Y_{dmt}(n)$ 545... --.

Column 9, Equation 8 reads

" $y_{dmt}(n) = y_{dmt}(t)|_{t=nT_{dmt}} = \upsilon_{k=-\infty}^{28} s(k)h(n-k)||,...$ " and should read -- $y_{dmt}(n) = y_{dmt}(t)|_{t=nT_{dmt}} = \Sigma_{k=-\infty}^{\infty} s(k)h(n-k)||,...$ --.

Column 10, Equation 10 reads " $y_{pam}(t) = \Sigma_{j=1}^{J} y_j(t),...$ " and should read -- $y_{pam}(t) = \Sigma_{j=1}^{J} y_j(t),...$ --.

UNITED STATES PATENT AND TRADEMARK OFFICE
CERTIFICATE OF CORRECTION

PATENT NO. : 6,834,109 B1
APPLICATION NO. : 09/710610
DATED : December 21, 2004
INVENTOR(S) : Thomas E. Pare, Jr. et al.

It is certified that error appears in the above-identified patent and that said Letters Patent is hereby corrected as shown below:

Column 10, Equation 11 reads " $y_j(t) = \Sigma_{k=-\infty}^{\infty} s_j(k) h_j(t-kT_j), \ldots$ " and should read -- $y_j(t) = \Sigma_{k=-\infty}^{\infty} s_j(k) h_j(t-kT_j), \ldots$ --.

Column 10, Equation 14 reads " $y_j(n) = \Sigma_{k=-\infty}^{28} s_j(k) h_j(n-kP_j)$ " and should read -- $y_j(n) = \Sigma_{k=-\infty}^{\infty} s_j(k) h_j(n-kP_j)$ --.

Column 10, line 36 should read -- It should be noted that if the baud period $T_j$ of each PAM --.

Column 14, line 33 should read -- ...compensated bit loading $b_2$ given by equation (22). --.

Column 14, line 67 should read -- ...parameter $\Gamma$ and the SNR before the gain is denoted as S,... --

Column 15, lines 11-20 read should read -- ...receiver does not exceed the Viterbi limit prescribed by $\Gamma_v$. Since the SNR at the first-pass DMT receiver is equal to the measured uncompensated SNR $S_1$, this condition is expressed by equation (33):

$$g_f \geq g_{fl} = \frac{\Gamma_v}{S_1}(2^{b_f} - 1)$$

As the second condition, the final gain $g_f$ has to guarantee... --.

UNITED STATES PATENT AND TRADEMARK OFFICE
CERTIFICATE OF CORRECTION

PATENT NO. : 6,834,109 B1
APPLICATION NO. : 09/710610
DATED : December 21, 2004
INVENTOR(S) : Thomas E. Pare, Jr. et al.

It is certified that error appears in the above-identified patent and that said Letters Patent is hereby corrected as shown below:

Column 15, lines 24-32 should read -- ...predicted to be the compensated SNR S2, this condition is expressed by equation (34):

$$g_f \geq g_{f2} = \frac{\Gamma}{S_2}\left(2^{b_f} - 1\right)$$

Thus, in this embodiment, the final gain is selected to satisfy both equations (33) and (34) and the final gain chosen to be the maximum value of... --.

Column 15, lines 32-38 should read -- ...(34) and the final gain chosen to be the maximum value of $g_{f1}$ and $g_{f2}$. Thus, the final gain of this embodiment $g_f$ is given by equation (35):

$$g_f = \max(g_{f1}, g_{f2})$$

FIG. 9 is a flowchart of the compensated SNR and bit ... --.

Column 17, lines 8-10 should read --...denoted as a set $G=\{g^{(f)}\}_{f=1}^{N}$, where each $g^{(f)}$ in the set corresponds to one such possible value. Similarly, there is an aggregated set $\tilde{G}=\{\tilde{g}^{(j)}\}_{j=1}^{N'}$ and $\tilde{g}_k \in \tilde{G}$. Thus, to minimize... --.

Column 19, line 59 reads, "...and δ (for the composite noise channel). Equations (50a) and..." and should read -- "...and $\bar{\delta}$ (for the composite noise channel). Equations (50a) and... --.

Column 20, line 11 should read -- ...unity in order to normalize the equalized response. Unit vector... --.

UNITED STATES PATENT AND TRADEMARK OFFICE
CERTIFICATE OF CORRECTION

PATENT NO. : 6,834,109 B1
APPLICATION NO. : 09/710610
DATED : December 21, 2004
INVENTOR(S) : Thomas E. Pare, Jr. et al.

It is certified that error appears in the above-identified patent and that said Letters Patent is hereby corrected as shown below:

Column 20, Equation 52c reads:

$$H_i^{in}=H_i(\delta+1:\delta+n_h,:), \text{ and } \overline{H}^{in}=\overline{H}(\delta+1:\overline{\delta}+n_{\overline{h}},:).$$

And should read:

$$H_i^{in}=H_i(\delta+1:\delta+n_h,:), \text{ and } \overline{H}^{in}=\overline{H}(\overline{\delta}+1:\overline{\delta}+n_{\overline{h}},:).$$

Column 20, line 38 should read -- It should be noted that the delay values $\delta$ and $\overline{\delta}$ are swept... --.

Column 21, lines 36-37 should read -- ...filter is compared at block 1450 with the target responses $b_1$ and $b_2$. The MSE e(k) is evaluated in order to obtain a VEQ... --.

Column 24, line 8 should read -- ...channel tracking are performed separately for the two PAM... --.

Column 24, line 19 should read -- ...blocks 1366 and 1368, or the time domain, illustrated by... --.

Column 24, line 41 should read -- ...the PAM channel tracking are further performed at block... --.

Column 24, line 44 should read -- ...on even date herewith, entitled, Method and Apparatus for Characterization of Disturbers in Communication Systems, assigned to the assignee... --.

UNITED STATES PATENT AND TRADEMARK OFFICE
CERTIFICATE OF CORRECTION

PATENT NO. : 6,834,109 B1
APPLICATION NO. : 09/710610
DATED : December 21, 2004
INVENTOR(S) : Thomas E. Pare, Jr. et al.

It is certified that error appears in the above-identified patent and that said Letters Patent is hereby corrected as shown below:

Column 24, line 66 should read -- ... consists mainly of cross-talk disturbance. In one embodiment ... --.

Column 25, line 34 should read -- ...of a slicer implementation are not described herein. --.

Column 26, lines 66-67 should read -- ...confusion further details of a JVA implementation are not described herein. --.

Column 27, line 67 should read -- ...mented as 256 complex scalar multipliers. --.

Column 29, line 33 should read -- ...tive of the instantaneous square of the error (i.e., not the... --.

Column 31, CLAIM 1, line 24 should read -- ...interfering signal using the compensation system; and... --.

Column 31, CLAIM 3, line 36 should read -- ...estimated, compensated signal-to-noise ratio of each... --.

Column 31, CLAIM 9, line 56 should read -- ...designing an equalizer in order to pre-filter the at least one... --.

Column 32, CLAIM 20, line 42 should read -- ...interfering signal using the compensation system; and... --.

UNITED STATES PATENT AND TRADEMARK OFFICE
CERTIFICATE OF CORRECTION

PATENT NO. : 6,834,109 B1
APPLICATION NO. : 09/710610
DATED : December 21, 2004
INVENTOR(S) : Thomas E. Pare, Jr. et al.

It is certified that error appears in the above-identified patent and that said Letters Patent is hereby corrected as shown below:

Column 32, CLAIM 22, line 54 should read -- ...estimated, compensated signal-to-noise ratio of each... --.

Column 33, CLAIM 28, line 10 should read -- ...designing an equalizer in order to pre-filter the at least one... --.

Column 33, CLAIM 39, line 67 should read -- ...interfering signal using the compensation system; and... --.

Column 34, CLAIM 41, line 12 should read -- ...estimated, compensated signal-to-noise ratio of each... --.

Column 34, CLAIM 47, line 35 should read -- ...designing an equalizer in order to pre-filter the at least one... --.

Column 35, CLAIM 58, line 13 should read -- ...designing an equalizer in order to pre-filter the at least one... --.

Column 36, CLAIM 68, line 13 should read -- ...main signal and at least one interfering signal; ... --.

UNITED STATES PATENT AND TRADEMARK OFFICE
CERTIFICATE OF CORRECTION

PATENT NO. : 6,834,109 B1
APPLICATION NO. : 09/710610
DATED : December 21, 2004
INVENTOR(S) : Thomas E. Pare, Jr. et al.

It is certified that error appears in the above-identified patent and that said Letters Patent is hereby corrected as shown below:

Column 36, CLAIM 68, line 14 should read -- ...a removal module for removing the main signal from the... --.

Signed and Sealed this

Twenty-fourth Day of October, 2006

JON W. DUDAS
*Director of the United States Patent and Trademark Office*